United States Patent
Yin et al.

(10) Patent No.: US 12,548,852 B2
(45) Date of Patent: Feb. 10, 2026

(54) CERAMIC CROSS-LINKED COATING ON A POROUS MEMBRANE AND METHODS FOR MAKING THE SAME

(71) Applicant: Celgard, LLC, Charlotte, NC (US)

(72) Inventors: Wenbin Yin, Charlotte, NC (US); James Rapley, Concord, NC (US); Xiang Yu, Indian Land, SC (US); Stefan Reinartz, Waxhaw, NC (US); Yuji Masui, Shizuoka (JP); Daisuke Narushima, Kanagawa (JP); Yuya Iwasaki, Shiga (JP)

(*) Notice: Subject to any disclaimer, the term of this patent is extended or adjusted under 35 U.S.C. 154(b) by 658 days.

(21) Appl. No.: 17/796,264

(22) PCT Filed: Feb. 12, 2021

(86) PCT No.: PCT/US2021/017853
§ 371 (c)(1),
(2) Date: Jul. 29, 2022

(87) PCT Pub. No.: WO2021/163478
PCT Pub. Date: Aug. 19, 2021

(65) Prior Publication Data
US 2023/0344081 A1 Oct. 26, 2023

Related U.S. Application Data

(60) Provisional application No. 63/016,163, filed on Apr. 27, 2020, provisional application No. 62/976,200, filed on Feb. 13, 2020.

(51) Int. Cl.
| | |
|---|---|
| C09D 7/65 | (2018.01) |
| C07D 303/16 | (2006.01) |
| C09D 4/00 | (2006.01) |
| C09D 7/43 | (2018.01) |
| C09D 7/45 | (2018.01) |
| C09D 7/61 | (2018.01) |
| C09D 7/63 | (2018.01) |
| C09D 133/14 | (2006.01) |
| C09D 171/02 | (2006.01) |
| H01M 10/42 | (2006.01) |
| H01M 50/403 | (2021.01) |
| H01M 50/414 | (2021.01) |
| H01M 50/42 | (2021.01) |
| H01M 50/429 | (2021.01) |
| H01M 50/434 | (2021.01) |
| H01M 50/443 | (2021.01) |
| H01M 50/446 | (2021.01) |
| H01M 50/451 | (2021.01) |
| H01M 50/457 | (2021.01) |
| H01M 50/489 | (2021.01) |

(52) U.S. Cl.
CPC ........ *H01M 50/451* (2021.01); *C07D 303/16* (2013.01); *C09D 4/00* (2013.01); *C09D 7/43* (2018.01); *C09D 7/45* (2018.01); *C09D 7/61* (2018.01); *C09D 7/63* (2018.01); *C09D 7/65* (2018.01); *C09D 133/14* (2013.01); *C09D 171/02* (2013.01); *H01M 10/4235* (2013.01); *H01M 50/403* (2021.01); *H01M 50/414* (2021.01); *H01M 50/42* (2021.01); *H01M 50/4295* (2021.01); *H01M 50/434* (2021.01); *H01M 50/443* (2021.01); *H01M 50/446* (2021.01); *H01M 50/457* (2021.01); *H01M 50/489* (2021.01)

(58) Field of Classification Search
None
See application file for complete search history.

(56) References Cited

U.S. PATENT DOCUMENTS

| | | | |
|---|---|---|---|
| 5,631,100 A | 5/1997 | Yoshino et al. | |
| 6,692,586 B2 | 2/2004 | Xu et al. | |
| 2011/0027658 A1 † | 2/2011 | Kim | |
| 2015/0333309 A1 * | 11/2015 | Lai | H01M 10/0525 429/145 |

(Continued)

FOREIGN PATENT DOCUMENTS

| | | | | |
|---|---|---|---|---|
| EP | 2116372 A1 * | 11/2009 | ......... | H01M 50/451 |
| KR | 101723994 B1 † | 4/2017 | | |
| WO | WO2016182827 | 11/2016 | | |

(Continued)

OTHER PUBLICATIONS

MA0735—Methacryloxypropyl POSS, available online at https://www.hybridplastics.com/product/ma0735-methacryl-propyl-poss/, date unknown.*

(Continued)

*Primary Examiner* — Anca Eoff

(74) *Attorney, Agent, or Firm* — J. Clinton Wimbish; Maynard Nexsen PC

(57) ABSTRACT

A porous membrane having a cross-linked ceramic coating on at least one side thereof is disclosed. The coated porous membrane may be used as a battery separator, particularly a battery separator for a lithium ion battery. The coating includes at least a cross-linker and a ceramic. The cross-linker may be a particulate polymeric binder cross-linker, a PEO (PEG) cross-linker, or a POSS cross-linker. The coated membrane exhibits improved properties that may be favorable for its use as a battery separator. For example, the coated porous membrane may exhibit improved shrinkage properties and high temperature resistance.

27 Claims, 17 Drawing Sheets

(56) References Cited

U.S. PATENT DOCUMENTS

2017/0263908 A1* 9/2017 Laicer ............... H01M 50/446
2021/0057703 A1* 2/2021 Hamada ............ H01M 50/423

FOREIGN PATENT DOCUMENTS

| WO | WO 2017/049065 | 3/2017 | | |
|----|----------------|--------|---|---|
| WO | WO2018017944 A1 † | 1/2018 | | |
| WO | WO-2019130994 A1 * | 7/2019 | .......... | H01M 10/052 |

OTHER PUBLICATIONS

Najafi, A., Ghasemi, S.—A study of APC surfactant role on the surface characteristics, size and morphology improvements of synthesized mesoporous silica nanopowder through a sol-gel process, Journal of Alloys and Compounds 720 (2017)423-431 (Year: 2017).*
PCT Search Report dated May 27, 2021, from PCT counterpart Application No. PCT/US 2021/017853.
PCT IPRP dated Aug. 11, 2022, from PCT counterpart Application No. PCT/US 2021/017853.
PCT Written Opinion dated May 27, 2021 from PCT counterpart Application No. PCT/US 2021/017853.

\* cited by examiner
† cited by third party

| Component | Normalized % of Dried solid vs. Alumina |
|---|---|
| DI Water | 0.00 |
| Alumina | 100.00 |
| dispersant | 0.10 to 5 |
| thickener | 0.5 to 5 |
| Particulate polymeric cross-linker | 0.01 to 10 |
| di-carboxylate surfactant | 0.05 to 0.5 |

FIG. 1

| Properties | Celgard® Base Film 1 | Comparative Example 1 (Coated Base Film 1) | Inventive Example 1 (Coated Base Film 1 with Cross-linked Coating) |
|---|---|---|---|
| Total thickness (mm) | 16 | 18 | 18 |
| Coating thickness (QC) (mm) | NA | 2 | 2 |
| Gurley (sec) | 210 | 228 | 250.6 |
| Moisture (ppm) | - | 548 | 537 |
| Shrinkage 130°C 1 hr MD | - | 2.54 | 1.5 |
| Shrinkage 150°C 1 hr MD | - | 15.46 | 3.5 |
| Puncture strength (gf) | 345 | 273 | 270 |
| DB average (V) | 1590 | 1811 | 1858 |
| Peel force 180° (N/m) | NA | 117 | 147 |
| Powder fall (mg/cm2) | NA | 0.025 | 0.017 |

FIG. 2

| Thermal Shrinkage at | | Comparative Example 1 (Coated Base Film 1) | Inventive Example 1 (Coated Base Film 1 with Cross-linked Coating) |
|---|---|---|---|
| 200°C 1h under a load of 2g/cm² (%) | MD | - | 0.35 |
| | TD | - | 0.10 |
| 200°C 5min without load (%) | MD | 25.3 | 4.3 |
| | TD | 3.7 | 3.7 |
| 200°C 10min without load (%) | MD | 32.4 | 13.7 |
| | TD | 4 | 3.7 |

FIG. 3

| Properties | Comparative Example 2 (Comparative CoatedBase Film 2) | Inventive Example 2 (Coated Base Film 2 with Cross-Linked Coating) | Comparative Example 3 (Comparative Coated Base Film 2) | Inventive Example 3 (Inventive Coated Base Film 2 with Cross-Linked Coating) |
| --- | --- | --- | --- | --- |
| Coating thickness (um) | 2.5 | 2.2 | 3.8 | 3.8 |
| Gurley (sec) | 224 | 232 | 249 | 248 |
| 120°C heat shrinkage 1 hr (%) MD | - | 2.4 | - | 0.2 |
| 130°C heat shrinkage 1 hr (%) MD | 7.2 | 3.7 | 1.6 | 0.5 |
| 150°C heat shrinkage 1 hr (%) MD | 17.2 | 6.6 | 2.8 | 1.8 |

FIG. 4

- ✓ Higher thermal stability
- ✓ High viscosity at high temperature
- ✓ Lower total moisture content with thinner coating
- ✓ Lower powder fall
- ✓ Decreased swelling helps preserve separator mechanical properties and affinity for electrolyte

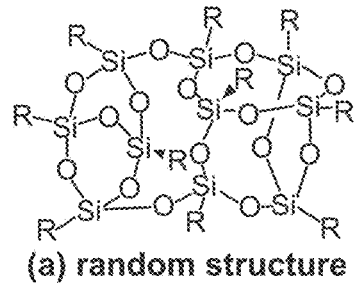
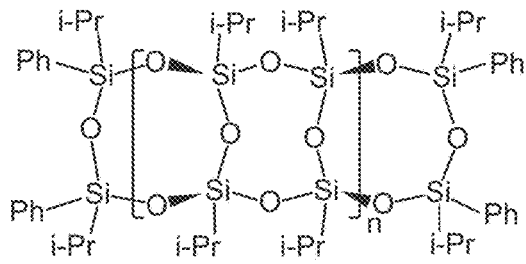
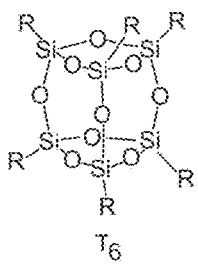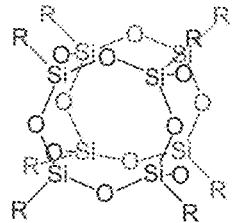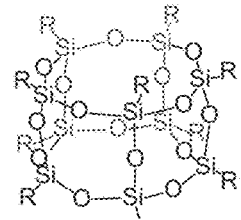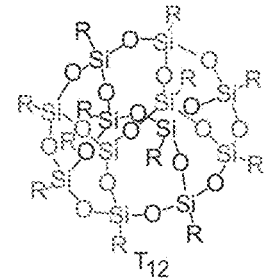
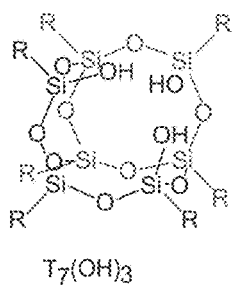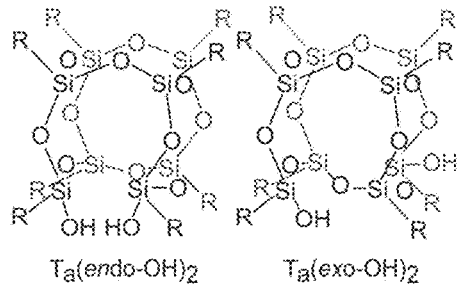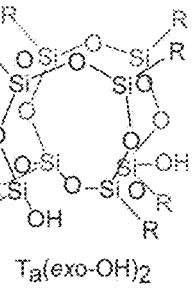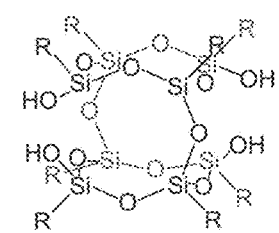
FIG. 6

Lower contact angle enable us to get smooth coating surface (high coating uniformity).

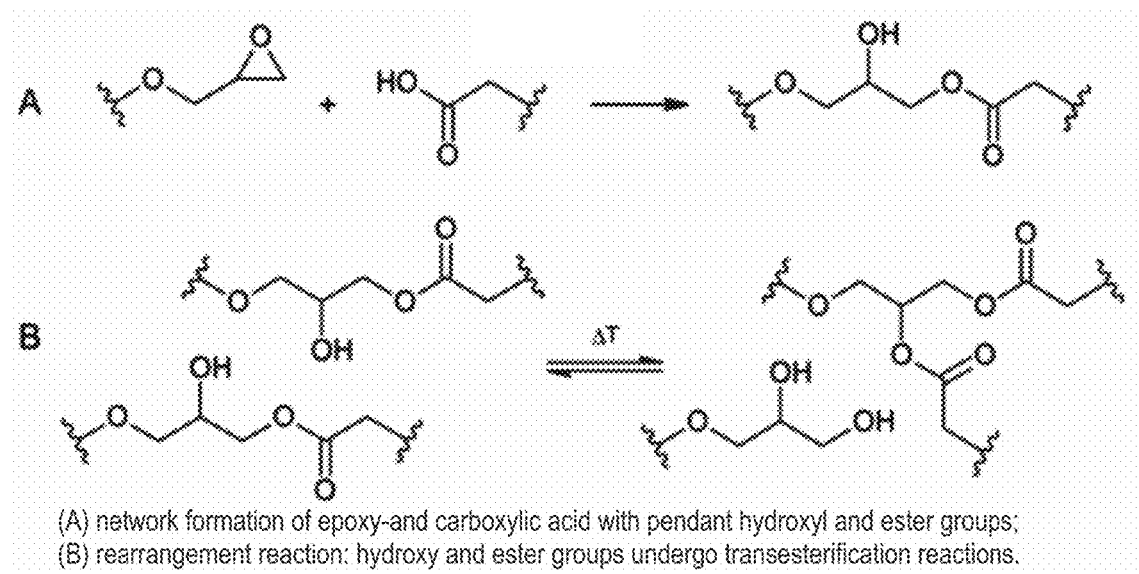
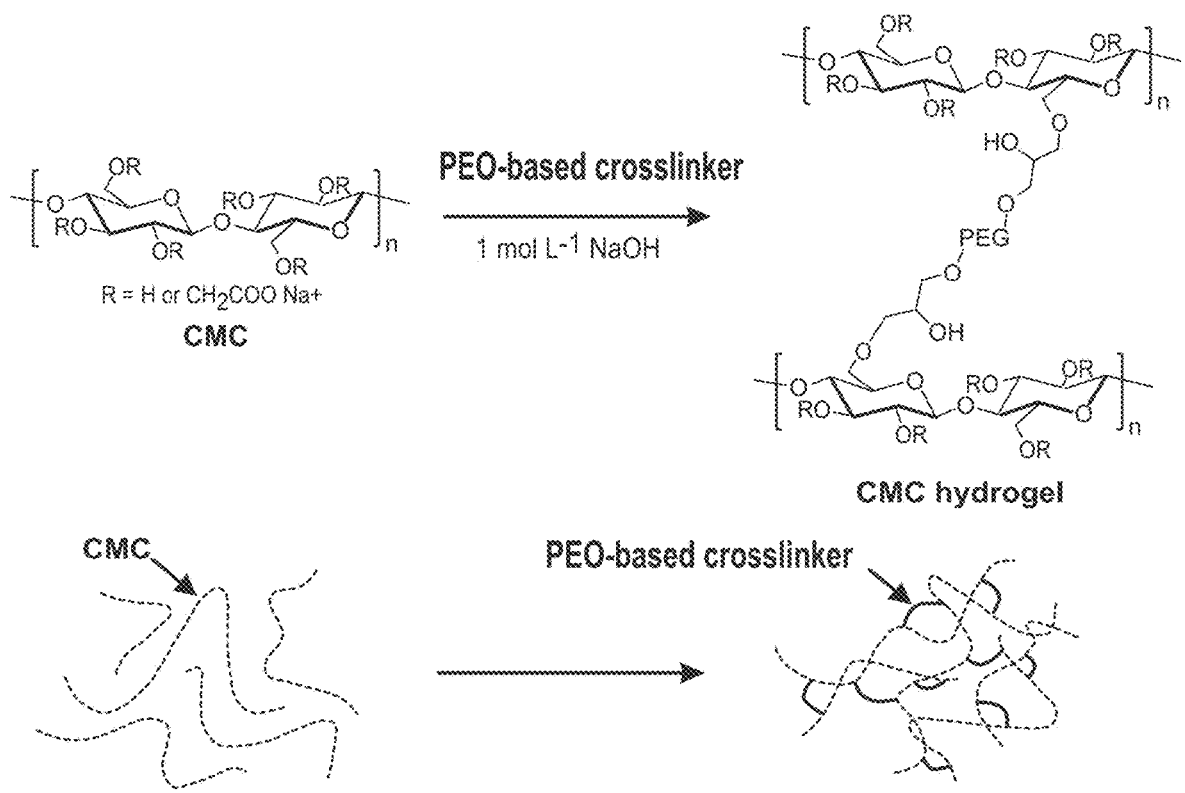

(A) network formation of epoxy-and carboxylic acid with pendant hydroxyl and ester groups;
(B) rearrangement reaction: hydroxy and ester groups undergo transesterification reactions.

Concept:
- Improving thermal stability and safety
- Decreasing pin removal strength
- Increasing battery life time by crosslinking binder and CMC in the coating layer
- Increasing wettability

FIG. 11

| Product ID | | CG | |
|---|---|---|---|
| | | Inventive Example 6 | Comparative Example 7 |
| Coating Thickness | | 2.5 micron | 2.3 micron |
| Coated film | JIS Gurley (s/100 cc) | 190 | 194 |
| | Powder Fall | 0.017 | 0.008 |
| | % Shrinkage 150 °C/1h MD/TD (QC) | 7.74/1.07 | 13.28/1.29 |
| | % Shrinkage 150 °C/1h MD/TD (QC with pressure) | 0.9/-0.51 | 1.1/0.04 |
| | % Shrinkage 150 °C/1h MD (lab 3 times reproducible) | 6.25 | 12.5 |
| | Peeling off (N/m) (180/90) | 96.88/36.82 (QC) 125.9/44.3 (BAL) | 122/45.59 (QC) 146.1/52.6 (BAL) |
| | Tensile Strength MD/TD | 1482/89 | 1538/92 |
| | Puncture Strength (gf) Coating side | 207 | 213 |
| | Puncture Strength (gf) Base side | 282 | 281 |
| | DB Average (V) | 1658 | 1784 |
| | Moisture | 384 | 496 |
| | Contact angle (PC solvent) | | |
| | Pin removal | 52.84 (5 data points) | 55.41 (4 data points) |
| | Coefficient of friction | 0.366 | 0.375 |

- Improving thermal stability

150°C, 1h

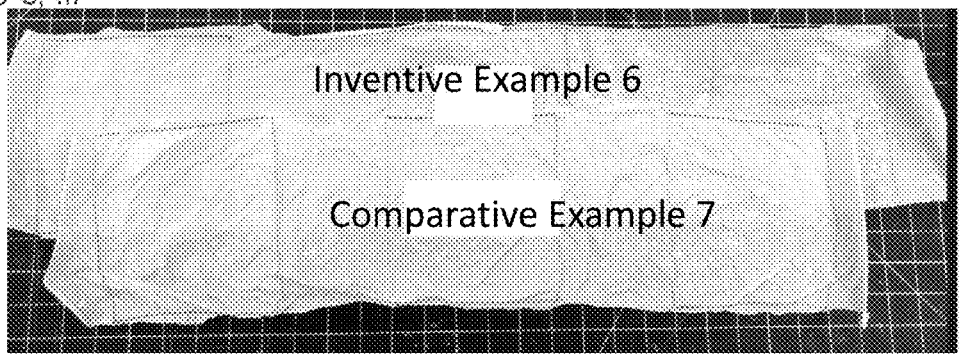

FIG. 12

CERAMIC CROSS-LINKED COATING ON A POROUS MEMBRANE AND METHODS FOR MAKING THE SAME

CROSS REFERENCE TO RELATED APPLICATIONS

This application is a 371 Application to PCT/US2021/017853, filed Feb. 12, 2021, which claims priority to U.S. Provisional No. 62/976,200, filed Feb. 13, 2020, and U.S. Provisional No. 63/016.163, filed Apr. 2, 2020, which is hereby fully incorporated by reference herein.

FIELD

This application relates to coated porous membranes, which may be used as battery separators in a secondary battery such as a lithium ion battery. More specifically, this application relates to a novel cross-linked ceramic coating that may be coated onto a porous membrane and a method for making the coating.

BACKGROUND

Beginning with U.S. Pat. No. 6,692,586, which is now RE47,520, assigned to Celgard LLC, ceramic-coated separators have become standard in the secondary battery industry, particularly the lithium ion battery industry. However, with the increase of energy density in today's batteries, there is a desire for even higher thermal stability of the separator than can be provided by a conventional ceramic-coated separator.

Additionally, there may be a desire for additional improved properties depending on the type of battery the ceramic-coated separator is being used in.

SUMMARY

In one aspect, an improved ceramic-coated separator is described herein. The improved ceramic-coated separator comprises a porous membrane and a cross-linked ceramic layer or coating provided on at least one side of the porous membrane. The improved ceramic-coated separator exhibits improved properties including exhibiting a MD heat shrinkage at 150° C. even when the ceramic coating is fairly thin, such as about 5 microns or less. The MD heat shrinkage at 150° C. may be less than 10% or less than 5%. This is an indicator that the separator has higher thermal stability. The improved ceramic-coated separator may also exhibit one of the following: high viscosity at high temperature than a traditional ceramic coating (another indicator of higher thermal stability), lower total moisture content with thinner coating, lower powder fall, and decreased swelling, which helps preserve separator mechanical properties and affinity for electrolyte.

The porous membrane may be a dry process or a wet process porous membrane. In some preferred embodiments, the porous membrane may be a microporous membrane, particularly a dry-process microporous membrane.

In some embodiments, the cross-linked ceramic coating may have a thickness of 10 microns or less, including 5 microns or less.

In some embodiments, the cross-linked ceramic coating may be provided on both sides of the porous membrane or a different type of coating may be provided on the side opposite to the ceramic-coated side of the porous membrane.

The cross-linked ceramic coating is preferably formed from an aqueous coating slurry or a coating slurry wherein the solvent is water with 10 volume % or less of an organic solvent or an alcohol. The cross-linked coating may also be formed using a non-aqueous coating slurry wherein the solvent is mainly an organic solvent or an alcohol.

The cross-linked ceramic coating may comprise ceramic particles and at least one cross-linker or cross-linking agent. This is in recognition that at least some cross-linker or cross-linking agent will remain unreacted even after the coating has been cross-linked. No reaction goes to completion, but instead are incomplete with reactants remaining.

The cross-linked ceramic coating may also comprise at least one selected from a thickening agent, an adhesion-promotion agent, a surfactant, and a dispersant. The thickening agent may be a cellulose-based thickening agent. The adhesion-promotion agent may be a PVDF homopolymer or copolymer or particles comprising a PVDF homopolymer or copolymer. The surfactant may be a di-anionic, tri-anionic, or poly-anionic surfactant. In some embodiments, the surfactant may be a di-anionic surfactant with a di-carboxylate structure, a di-sulfate structure, a di-sulfonate structure, and a di-phosphate structure. In some embodiments, the di-anionic surfactant may have the following formula (1):

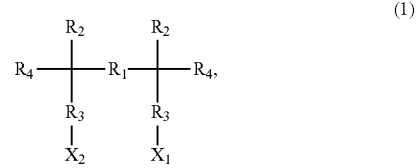

wherein $X_1$ and $X_2$ are anionic groups, $R_3$ is a C1 to C10 saturated or unsaturated branched or unbranched alkyl, alkene, or alkyne group; $R_4$ is a C1 to C10 saturated or unsaturated branched or unbranched alkyl, alkene, or alkyne group; $R_2$ is a C1 to C10 saturated or unsaturated branched or unbranched alkyl, alkene, or alkyne group; and $R_1$ is an alkyne or alkene group. In some embodiments, the di-anionic surfactant may have the following formula (2):

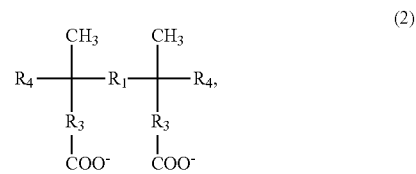

wherein $R_1$, $R_3$ and $R_4$ are as described above for formula (1). In some preferred embodiments, $R_1$ is an alkyne group.

The ceramic particles may comprise at least one selected from the group consisting of silicon dioxide ($SiO_2$), titanium oxide ($TiO_2$), boehmite (AlOOH), aluminum oxide ($Al_2O_3$), magnesium oxide (MgO), $BaSO_4$, and calcium carbonate ($CaCO_3$).

The cross-linker or cross-linking agent may be present in the cross-linked coating, in the slurry used to form the cross-linked coating, or in a slurry layer coated on the porous membrane (before being cross-linked) in an amount of 0.01 to 100, 0.01 to 50, 0.01 to 25, 0.01 to 15, 0.01 to 100, or 0.01 to 5 parts by weight per 100 parts by weight of the ceramic particles.

The cross-linker or cross-linking agent may be a compound comprising two or more, four or more, six or more, eight or more, or ten or more reactive groups. The reactive groups of the cross-linker or cross-linking agent may comprise at least one of an epoxy group, a vinyl group, an amino group, and an isocyanate group. In some preferred embodiments, the reactive group may comprise at least one of an epoxy group, an amino group, and an isocyanate group.

In some preferred embodiments, the cross-linker or cross-linking agent may be at least one of particulate polymeric binder cross-linker or cross-linking agent, a POSS cross-linker or cross-linking agent, a PEO(PEG) cross-linker or cross-linking agent, and mixtures thereof.

The particulate polymeric binder cross-linker or cross-linking agent may, in some preferred embodiments, be a particulate acrylic binder cross-linker or cross-linking agent. The particulate polymeric binder cross-linker or cross-linking agent or the particulate acrylic binder particle may comprise a polymeric or acrylic binder particle with at least one of the following reactive groups on a surface thereof: an epoxy group, a vinyl group, an amino group, and an isocyanate group. The particle may have a size of 5 to 500 nm, 10 to 400 nm, 15 to 300 nm, 20 to 200 nm, or 25 to 100 nm.

The POSS cross-linker or cross-linking agent may have two or more, four or more, six or more, eight or more, or ten or more reactive groups. The POSS of the POSS cross-linker or cross-linking agent may have a random structure, a caged structure, an open-cage structure, a ladder-like structure, or a double-decker structure.

In some embodiments, the POSS cross-linker or cross-linking agent may have the following general formula (3):

wherein the POSS may have a random structure, a caged structure, an open-cage structure, a ladder-like structure, or a double-decker structure, n is an integer greater than 2 or greater than 5, R is a C1 to C10 saturated or unsaturated alkyl, alkene, or alkyne group; X is a reactive group, and wherein (R—O—X) is bonded to an oxygen or silicon of the POSS. Sometimes, the POSS cross-linker or cross-linking agent has the following structure (4)

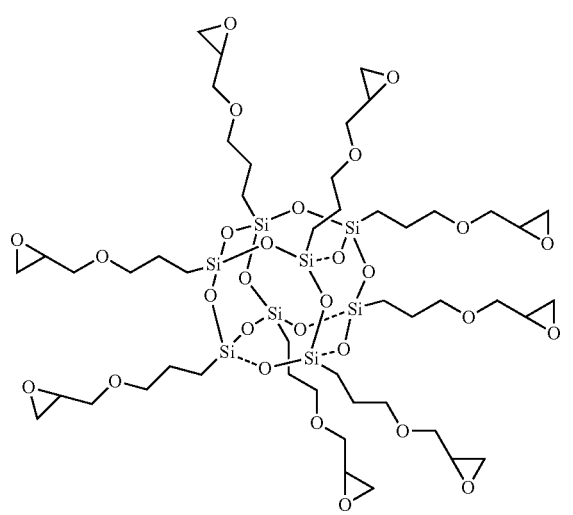

Sometimes, the POSS cross-linker or cross-linking agent has the following structure (5)

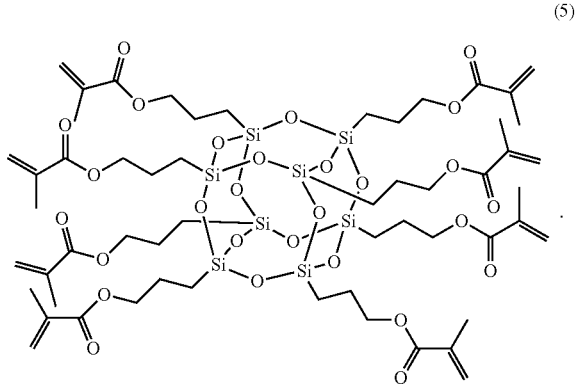 [SMILES: C=C(C)C(=O)OCCC[Si]12O[Si]3(CCCOC(=O)C(=C)C)O[Si]4(CCCOC(=O)C(=C)C)O[Si](CCCOC(=O)C(=C)C)(O1)O[Si]1(CCCOC(=O)C(=C)C)O[Si](CCCOC(=O)C(=C)C)(O2)O[Si](CCCOC(=O)C(=C)C)(O3)O[Si](CCCOC(=O)C(=C)C)(O4)O1]

In some embodiments, the PEO(PEG) cross-linker or cross-linking agent may have two or more, four or more, six or more, eight or more, or ten or more reactive groups. The reactive groups of the cross-linker or crosslinking agent may comprise at least one of an epoxy group, a vinyl group, an amino group, and an isocyanate group. In some preferred embodiments, the reactive group may comprise at least one of an epoxy group, an amino group, and an isocyanate group.

The PEO(PEG) cross-linker or cross-linking agent may be a bi-, tri-, tetra-, or poly-glycidyl ether or a bi-, tri-, tetra-, or poly-acrylate. In some embodiments, the PEO(PEG) cross-linker or cross-linking agent may have any one of the following structures:

(6)
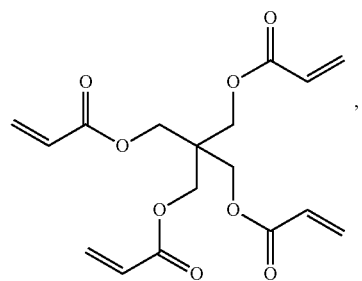
(11)
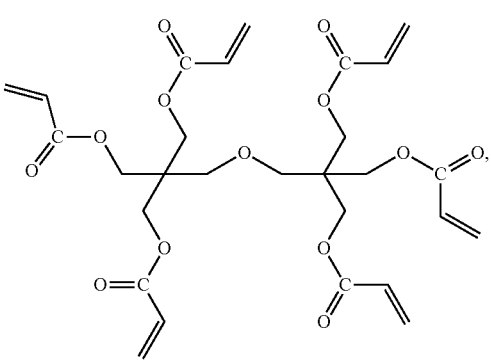
(7)
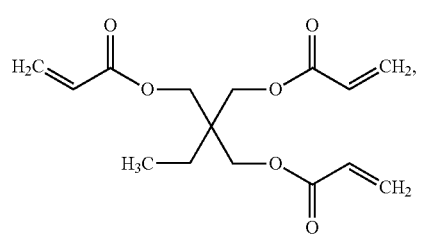
(12)
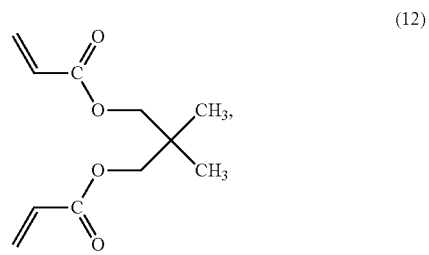
(8)
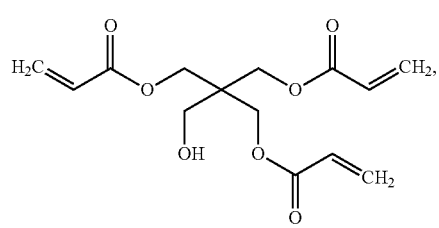
(13)
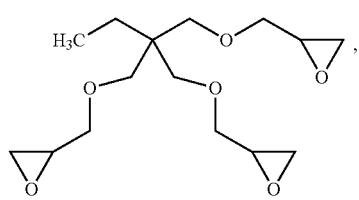
(9)
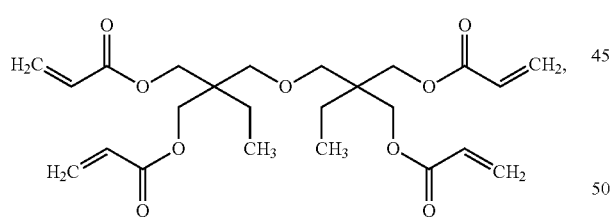
(14)
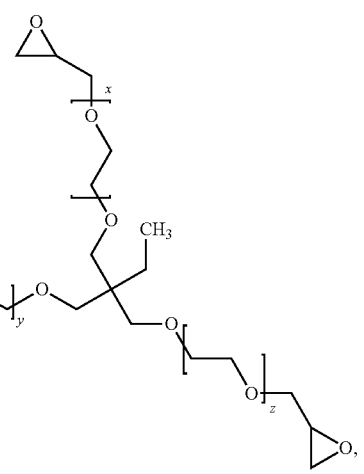
(10)
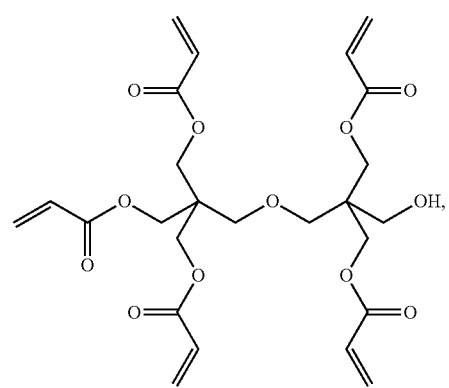
(15)
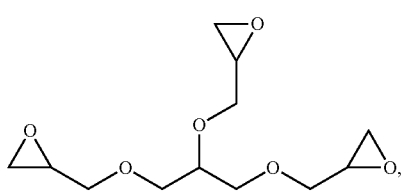

-continued

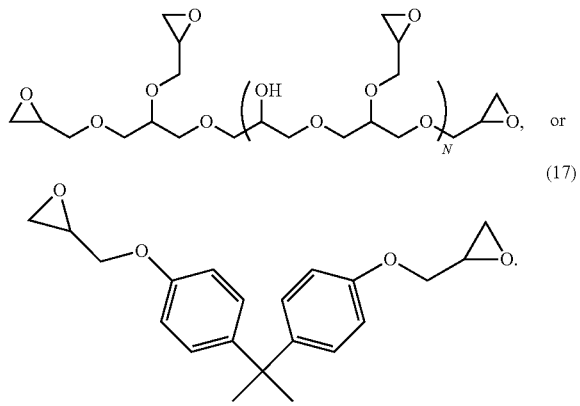

(16)

(17)

In some embodiments, the PEO(PEG) cross-linker or cross-linking agent may have the following structure (17)

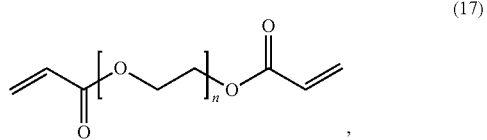

(17)

where n is an integer from 1 to 100,000 or more

The PEO(PEG) cross-linked or cross-linking agent may also have the following structure

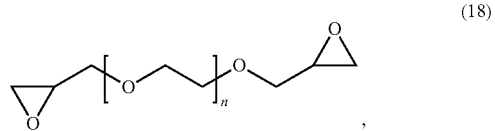

(18)

where n is an integer from 1 to 100,000 or more.

In some embodiments, a long-chain PEO, short-chain PEO, or mixtures thereof may be added in addition to the PEO(PEG) cross-linker. The long chain and short chain PEO may have the following structure (19):

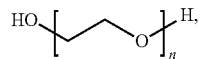

wherein n is less than 1,000 for a short-chain and 1,000 or more (as high as 100,000) for a long chain.

In another aspect, a method for forming a coated battery separator with a cross-linked ceramic coating is described herein. The method may comprise the following steps: (1) applying a slurry to at least one side of a porous membrane to form a slurry layer, wherein the slurry comprises ceramic particles, a cross-linker or cross-linking agent, and a solvent; and (2) cross-linking the slurry layer. The ceramic particles are as described herein. The cross-linker or cross-linking agent is as described herein. The solvent is either an aqueous solvent of only water or water and less than 10 volume % of an alcohol or an organic solvent. The solvent may also be a non-aqueous solvent comprising mainly alcohol or an organic solvent. The slurry may further comprises at least one selected from a thickening agent, an adhesion-promotion agent, a surfactant, and a dispersant, each of these being as described herein.

The method may further comprise a step of drying the slurry layer before, after, or before and after cross-linking. Cross-linking may comprise applying light (including UV light), heat, or light (including UV light) and heat to the slurry layer. In some embodiments, the slurry may comprise a photoinitiator or photosensitizer to initiate or speed up the cross-linking reaction.

DRAWINGS

FIG. 1 is a Table including data according to some embodiments described herein.

FIG. 2 is a Table including data according to some embodiments described herein.

FIG. 3 is a Table including data according to some embodiments described herein.

FIG. 4 is a Table including data according to some embodiments described herein.

Figure 5A:
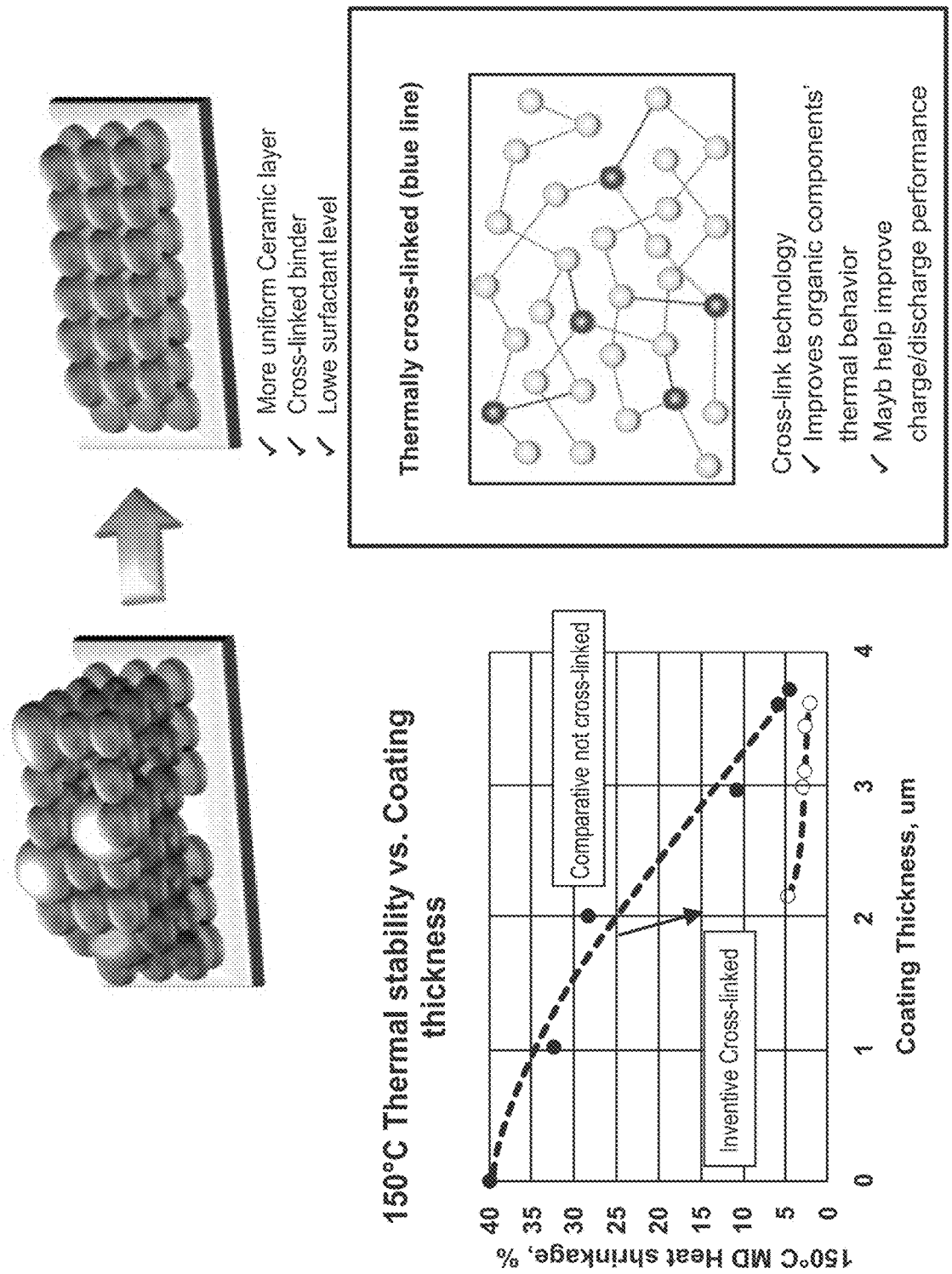
Figure 5B:
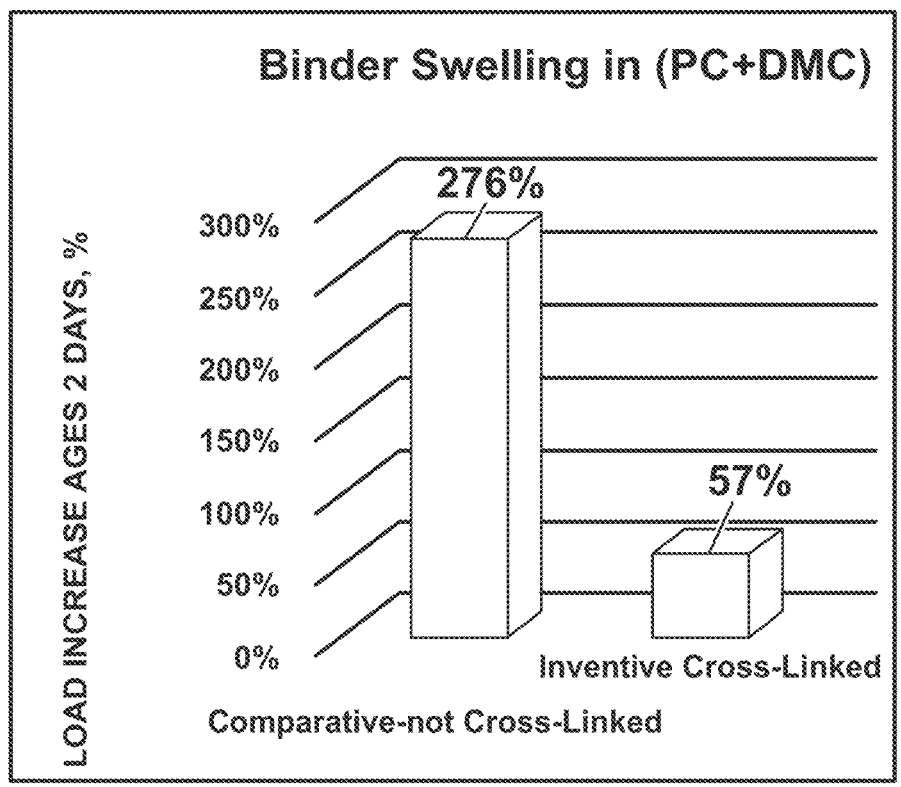

FIG. 5A and FIG. 5B include charts and graphs describing and including data according to some embodiments described herein.

FIG. 6 includes POSS structures according to some embodiments described herein.

Figure 7:
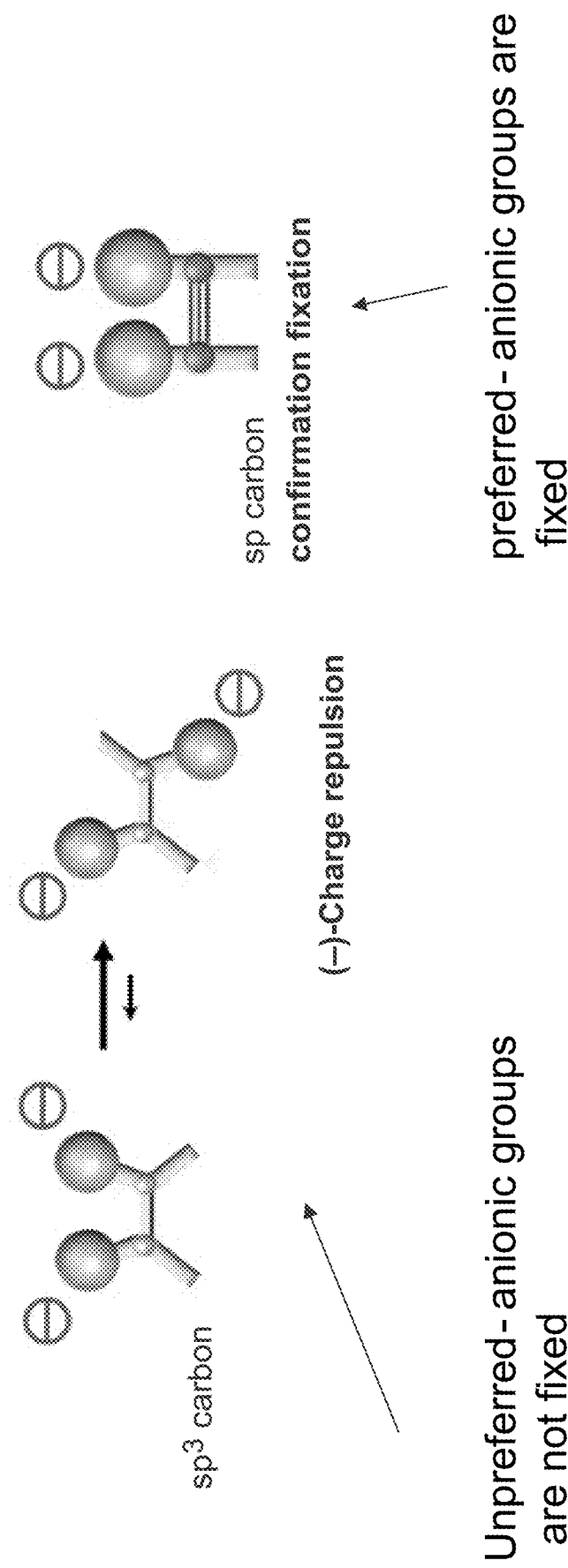

FIG. 7 shows examples of di-anionic surfactants, including those preferred herein.

Figure 8:
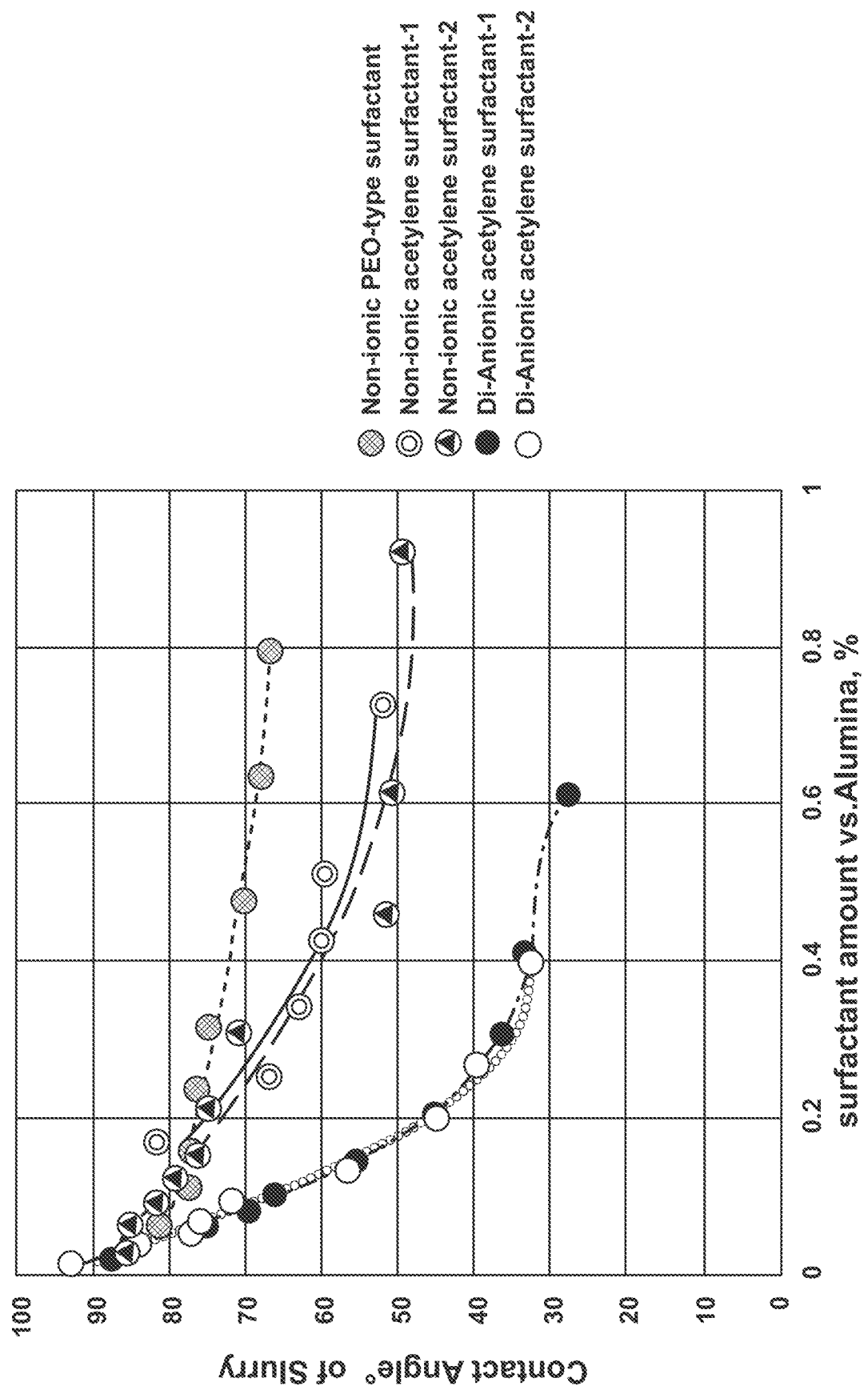

FIG. 8 is a graph of measured contact angle for a range of surfactant amount vs. alumina, % for inventive and comparative embodiments disclosed herein.

Figure 9:
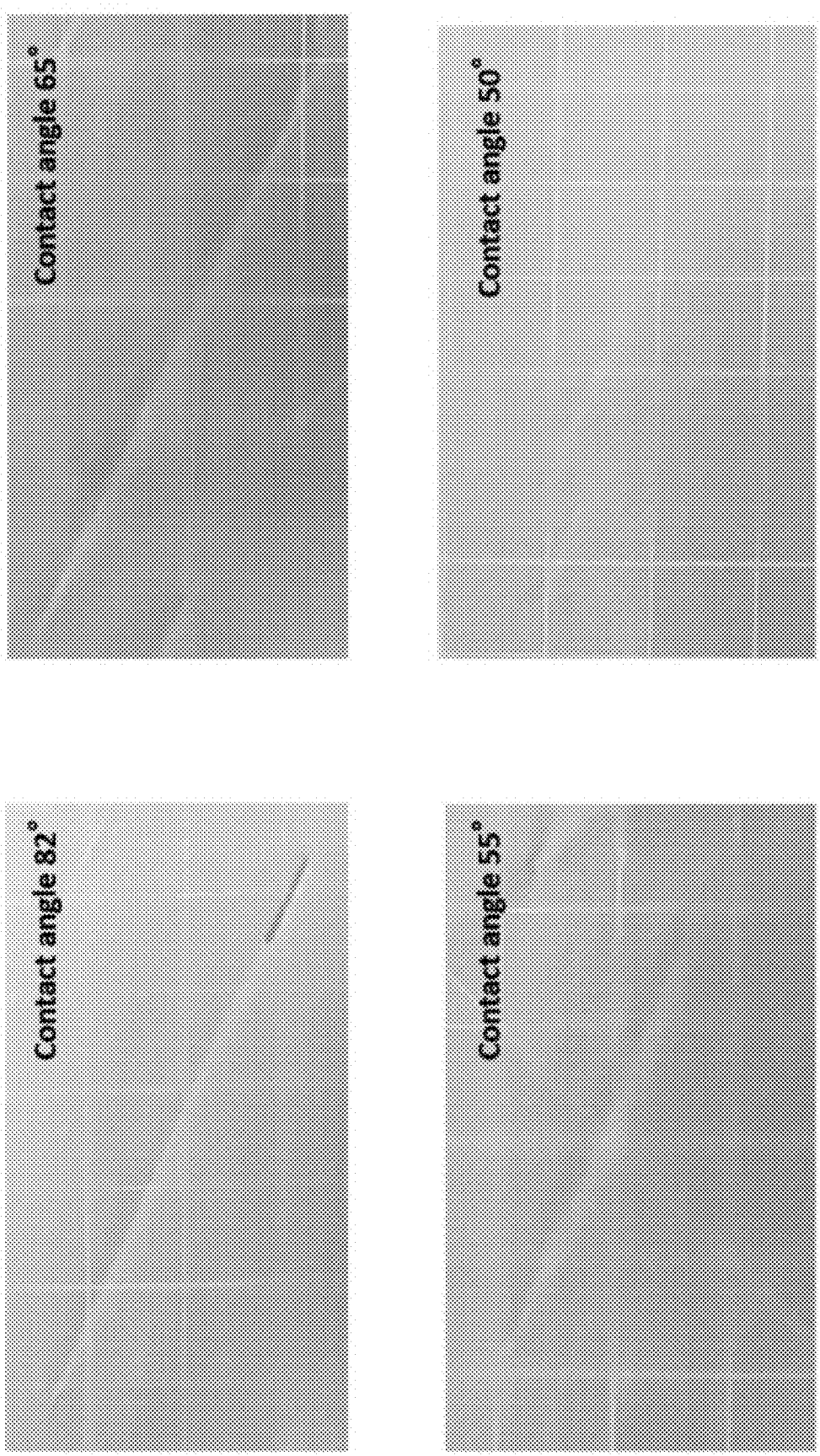
Figure 10:
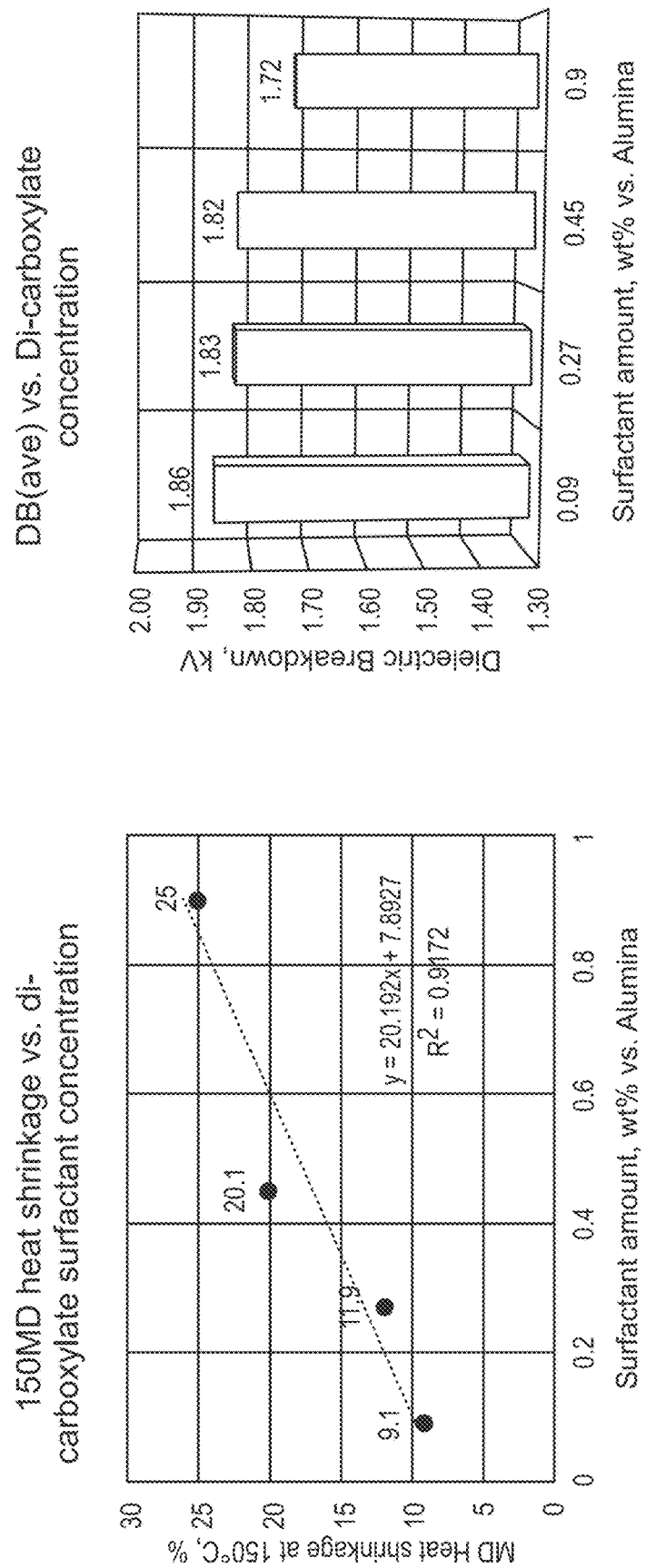

FIG. 9 includes images of coating smoothness for different contact angles of the surface the coating is applied to (membrane and slurry contact angle) FIG. 10 includes graphs of MD heat shrinkage at 150° C. and dielectric breakdown for a range of surfactant amounts for some embodiments disclosed herein.

FIG. 11 depicts formation of a cross-linking agent according to some embodiments disclosed herein, and shows a cross-linking reaction according to some embodiments herein.

FIG. 12 includes a Table including data pertaining to comparative and inventive embodiments described herein. It also includes an image demonstrating improved thermal shrinkage properties of inventive examples described herein.

Figure 13:
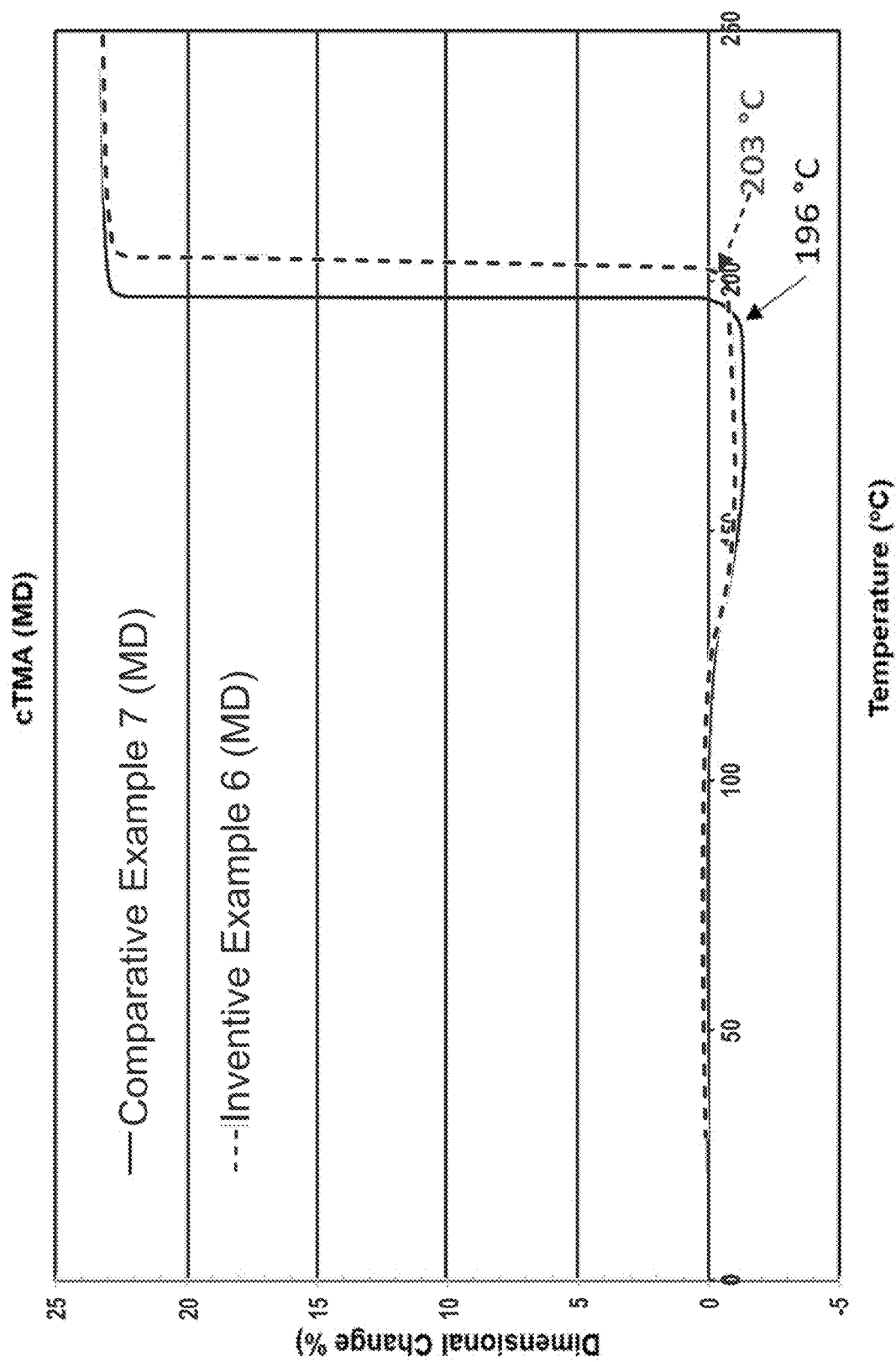

FIG. 13 is a graph including cTMA(MD) data for comparative and inventive examples described herein.

Figure 14:
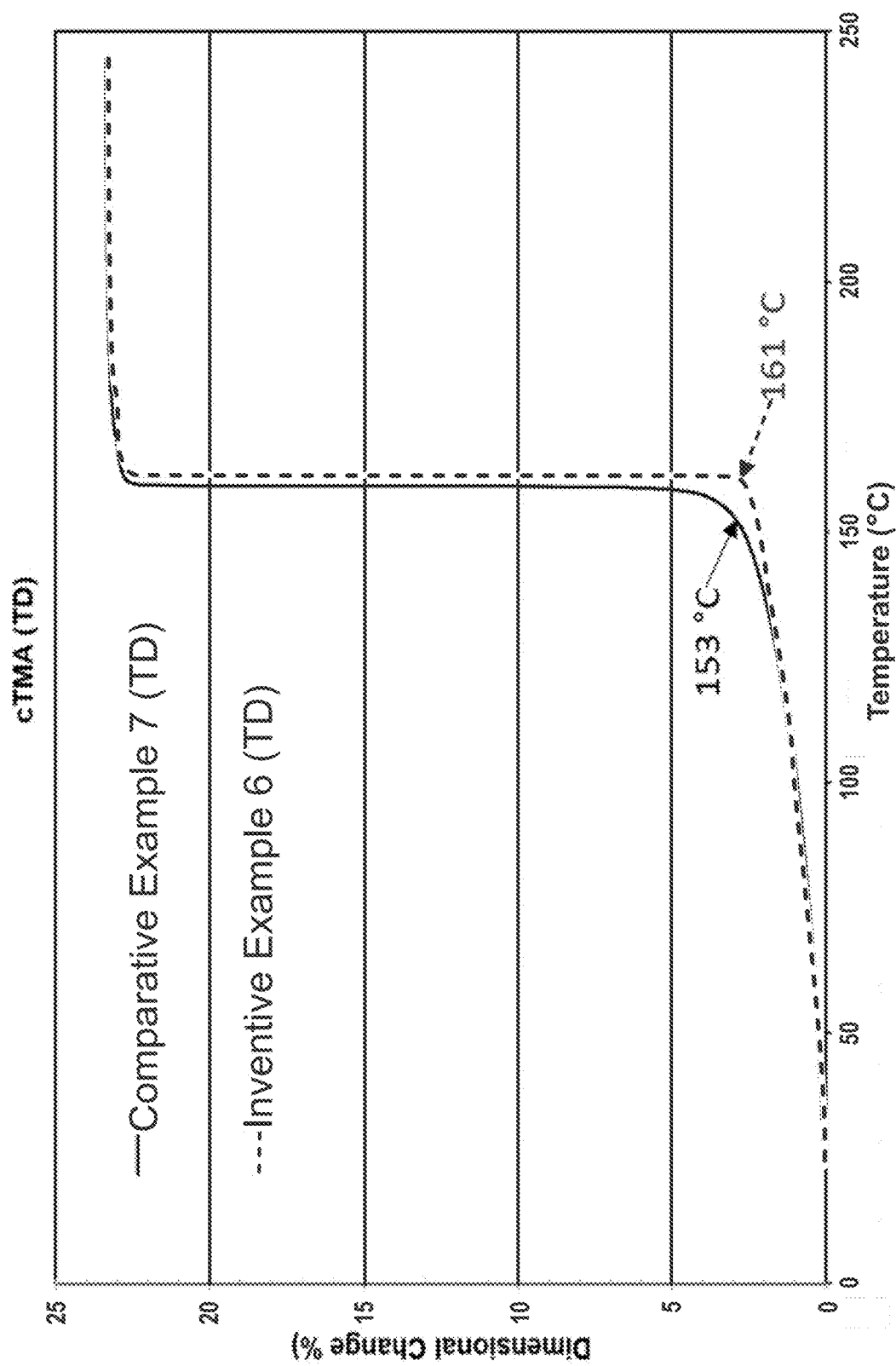

FIG. 14 is a graph including cTMA(TD) data for comparative and inventive examples described herein.

Figure 15:
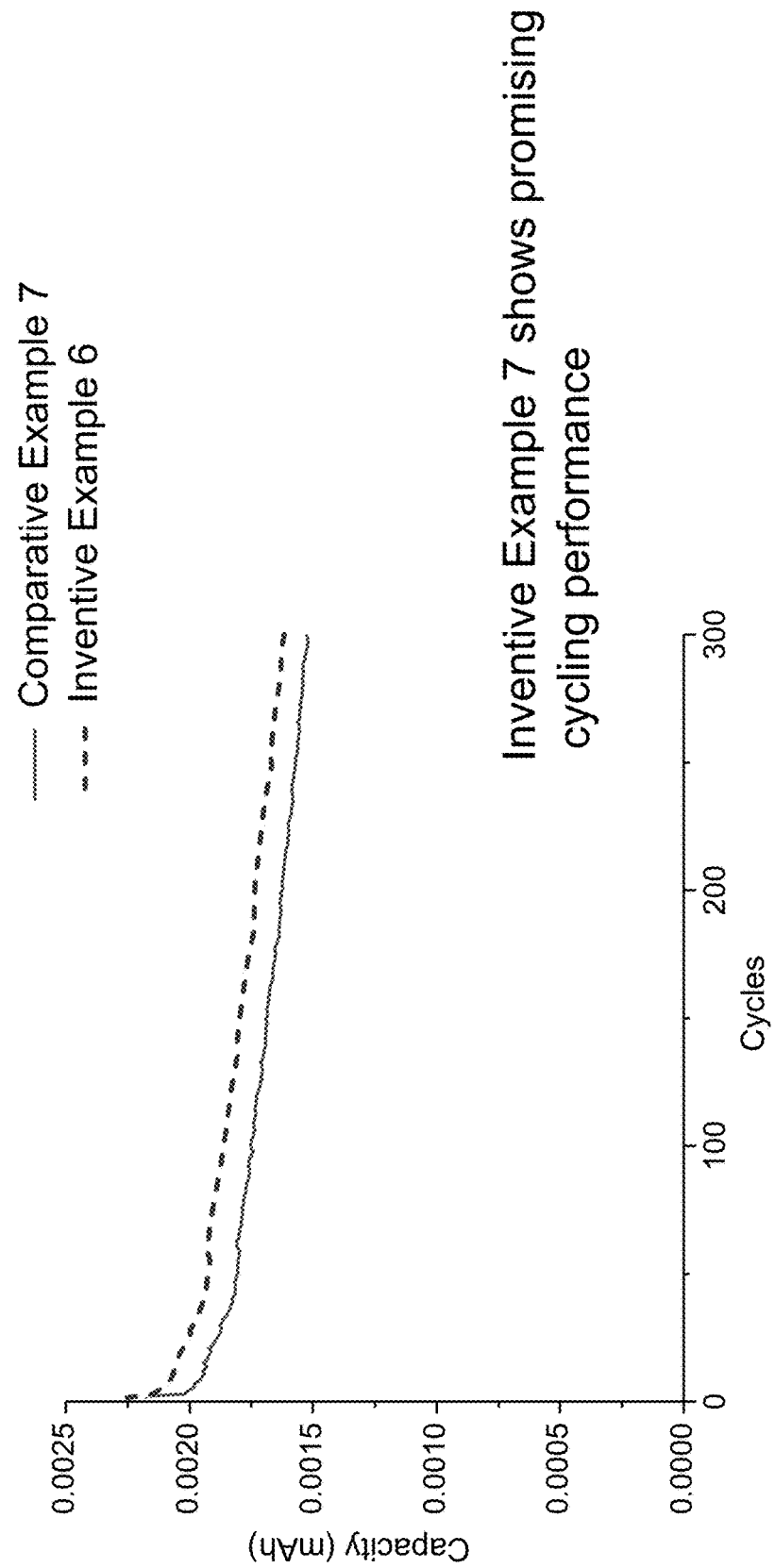

FIG. 15 is a graph showing cycling data (capacity after a certain number of cycles) for comparative and inventive examples described herein.

Figure 16:
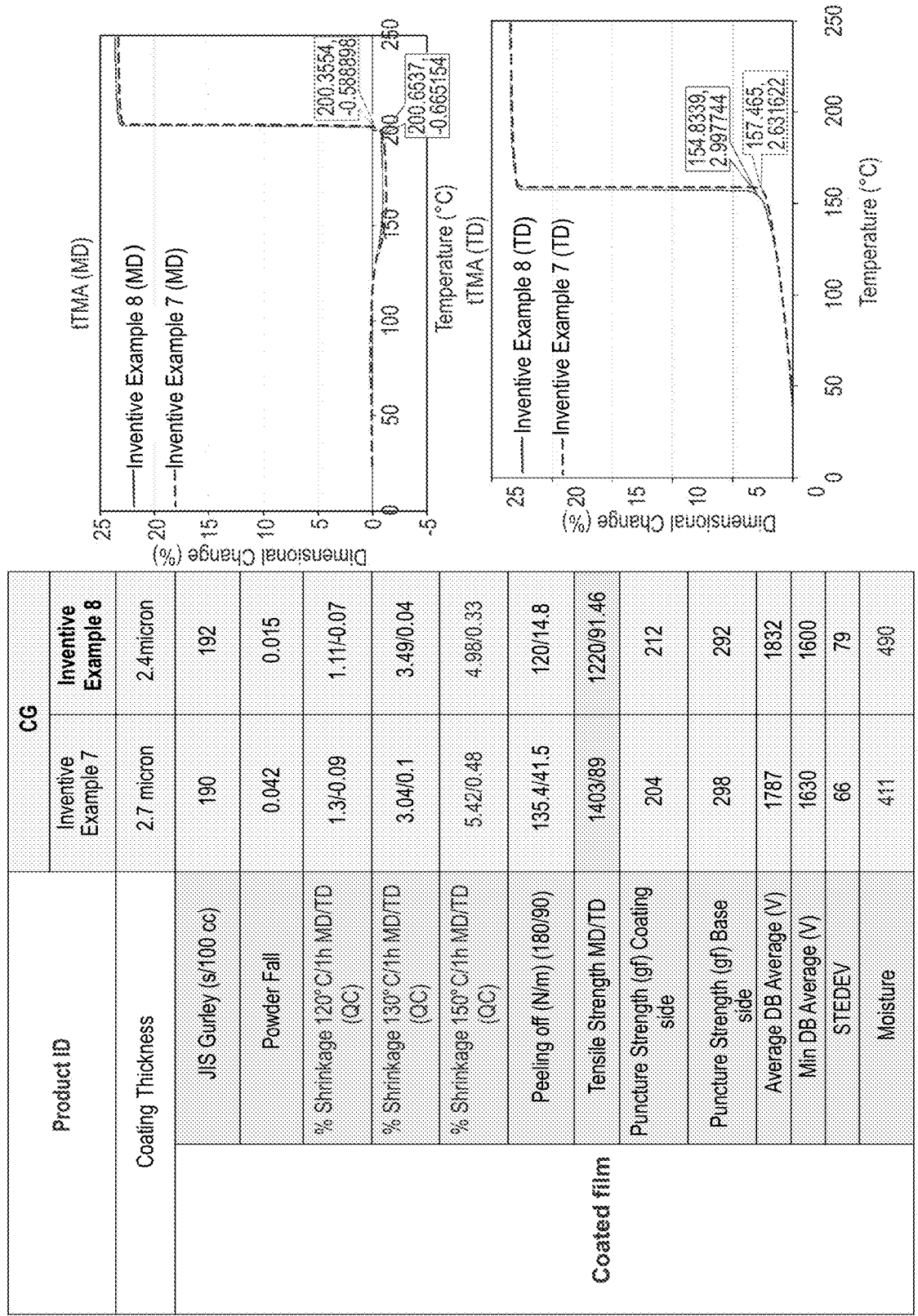

FIG. 16 includes a Table including data for inventive and comparative examples described herein. It also includes graphs of tTMA(MD) and tTMA(TD) for some embodiments disclosed herein.

DESCRIPTION

Coated Porous Membrane

Disclosed herein is an improved coated porous membrane or coated battery separator comprising, consisting of, or consisting essentially of the following: (1) a porous membrane and (2) a cross-linked ceramic coating on at least one side of the porous membrane. In some embodiments, a cross-linked ceramic coating may be provided on both sides of the porous membrane, different cross-linked ceramic coating may be provided on the two sides of the porous membrane, or a cross-linked ceramic coating may be provided on one side of the porous membrane and a different coating, e.g., a ceramic coating or a polymer coating may be provided on the other side.

The thickness of the cross-linked ceramic coating may be from 0.1 to 10 microns, from 0.1 to 9 microns, from 0.1 to 8 microns, from 0.1 to 7 microns, from 0.1 to 6 microns, from 0.1 to 5 microns, from 0.1 to 4 microns, from 0.1 to 3 microns, from 0.1 to 2 microns, from 0.1 to 1 micron, or from 0.1 to 0.5 microns.

Further, the whole thickness of the coated porous membrane may be from 1 to 50 microns, from 1 to 40 microns, from 1 to 30 microns, from 1 to 25 microns, from 1 to 20 microns, from 1 to 15 microns, from 1 to 10 microns, or from 1 to 5 microns.

The coating may be an aqueous coating or a non-aqueous coating. An aqueous coating is formed from a slurry where water is the solvent or water and less than 10 volume % of an alcohol are the solvents. A non-aqueous coating is formed from a slurry where the solvent is mainly an organic solvent. Structural differences may be seen between and aqueous and non-aqueous coating.

Porous Membrane

The porous membrane is not so limited. In some embodiments, the porous membrane may be macroporous, microporous, or nanoporous. In some embodiments, the membrane may have an average pore size from 0.1 to 1 microns.

The shape of the pores in the porous membrane is not so limited. For example, the pores may be slit-shaped, round, substantially round, trapezoidal, and/or irregular.

The porous membrane may be a membrane made by a dry process. One particular dry process is known as the Celgard® dry process, which includes at least steps of extrusion (or co-extrusion) and stretching. The stretching may be unidirectional, bi-directionally, or multi-directionally. Typically, a dry-process preferably does not include the use of solvents or oils. A dry-process may include the use of particulate pore-formers or it may not. For example, a beta-nucleated biaxially oriented porous membrane may be used, e.g., a membrane formed by beta-nucleated biaxially-oriented polypropylene (BNBOPP) film may be used.

The porous membrane may also be made by a wet process, which uses solvents or oils to form the pores.

The porous membrane may also be a woven or non-woven membrane.

Each of the dry-process, wet process, woven, and non-woven membranes have very different structures.

The porous membrane may be a monolayer, bi-layer, tri-layer, or multilayer porous membrane.

The thickness of the porous membrane may have a thickness from 1 to 50 microns, from 1 to 40 microns, from 1 to 30 microns, from 1 to 25 microns, from 1 to 20 microns, from 1 to 15 microns, from 1 to 10 microns, or from 1 to 5 microns.

The porous membrane may be a polymeric porous membrane, and the polymer is not so limited. The polymer in some preferred embodiments may be a polyolefin, including polyethylene, polypropylene, or co-polymers, terpolymers, or blends comprising the same and or another polymer.

Cross-linked Coatings

The cross-linked coating is not so limited and at least comprise a cross-linker or cross-linking agent. In some preferred embodiments, the cross-linked coating is a ceramic cross-linked coating comprising, consisting of, or consisting of the following: (1) a ceramic and (2) cross-linker or cross-linking agent. In some embodiments, the ceramic cross-linked coating may additionally comprise, consist of, or consist essentially of at least one of the following: (3) a thickening agent, (4) an adhesion-promotion agent, (5) a surfactant, (6) a dispersant, (7) a binder and combinations thereof.

The ratio of cross-linker or cross-linking agent to ceramic may be in the range of 0.1 to 100 parts of cross-linker or crosslinking agent to 100 parts ceramic, 0.1 to 90 parts of cross-linker or crosslinking agent to 100 parts ceramic, 0.1 to 80 parts of cross-linker or crosslinking agent to 100 parts ceramic, 0.1 to 70 parts of cross-linker or crosslinking agent to 100 parts ceramic, 0.1 to 60 parts of cross-linker or crosslinking agent to 100 parts ceramic, 0.1 to 50 parts of cross-linker or crosslinking agent to 100 parts ceramic, 0.1 to 40 parts of cross-linker or crosslinking agent to 100 parts ceramic, 0.1 to 30 parts of cross-linker or crosslinking agent to 100 parts ceramic, 0.1 to 25 parts of cross-linker or crosslinking agent to 100 parts ceramic, 0.1 to 20 parts of cross-linker or crosslinking agent to 100 parts ceramic, 0.1 to 10 parts of cross-linker or crosslinking agent to 100 parts ceramic, 0.1 to 5 parts of cross-linker or crosslinking agent to 100 parts ceramic, 0.1 to 4 parts of cross-linker or crosslinking agent to 100 parts ceramic, 0.1 to 3 parts of cross-linker or crosslinking agent to 100 parts ceramic, 0.1 to 2 parts of cross-linker or crosslinking agent to 100 parts ceramic, 0.1 to 1 parts of cross-linker or crosslinking agent to 100 parts ceramic, 0.1 to 0.5 parts of cross-linker or crosslinking agent to 100 parts ceramic.

(1) Ceramic

The ceramic is not so limited and may be any ceramic heretofore used in a ceramic coating. In some embodiments, the ceramic comprises at least one selected from the following group: silicon dioxide ($SiO_2$), titanium oxide ($TiO_2$), boehmite, aluminum oxide ($Al_2O_3$), magnesium oxide (MgO), barium sulfate ($BaSO_4$), and calcium carbonate ($CaCO_3$). In sorme embodiments, ceramic particles or flakes may be added.

The size of the ceramic is not so limited and may be nano-sized or micro-sized in preferred embodiments.

The size of the ceramic is not so limited. For example, the ceramic may be nano-sized or micro-sized. In addition, a mixture of smaller and larger ceramic particles may be used. This may help to create a denser ceramic coating with the smaller particles filling voids left between the larger packed particles.

(2) Cross-linker or Cross-linking Agent

The cross-linker or cross-linking agent described herein is not so limited, but the cross-linker preferably includes two or more, three or more, four or more, five or more, six or more, seven or more, eight or more, nine or more, ten or more, eleven or more, twelve or more, thirteen or more, fourteen or more, fifteen or more, sixteen or more, seventeen or more, eighteen or more, nineteen or more, or twenty or more reactive functional groups. The functional groups may be all the same or some may be different from the others.

The functional group is not so limited and may be, in some embodiments, a group capable of reacting with hydroxyl (OH) and carboxyl (COOH) groups present in the separator. For example, carboxyl or hydroxyl groups may be present on an external or internal surface of the porous membrane, on a dispersant molecule, on a thickener molecule, on the ceramic, or on a binder. Some examples of said reactive groups capable of reacting with hydroxyl and carboxyl groups include, but are not limited to, an epoxy group, an amino group, and an isocyanate group. In some preferred embodiments, the reactive functional groups may be at least one selected from an epoxy group, and amino group, a vinyl group, a (meth)acryloxy group, an isocyanate group, and a mercapto group.

Some particular cross-linkers or cross linking agents are described herein, but the description is not limited to these. These particular examples are (a) particulate polymeric binder cross-linker or cross-linking agent; (b) the POSS cross-linker or cross-linking agent, and (c) the PEO(PEG) cross-linker or cross-linking agent. Each of these is discussed in detail herein below.

(a) Particulate Polymeric Binder Cross-Linker or Cross-Linking Agent

The particulate polymeric binder cross-linker or cross-linking agent is not so limited and may comprise a polymeric particle with two or more, three or more, four or more, five or more, six or more, seven or more, eight or more, nine or more, ten or more, eleven or more, twelve or more, thirteen or more, fourteen or more, fifteen or more, sixteen or more, seventeen or more, eighteen or more, nineteen or more, or twenty or more reactive functional groups on either or both of internal and external surfaces of the polymeric particle. Preferably, two or more reactive functional groups are present on a surface of the polymeric particle. A brief overview of how a particulate polymeric binder cross-linker or cross-linking agent is made is disclosed in the examples herein. One or more particulate polymeric binder cross-linkers or cross-linking agents may be used.

The size of the polymeric particle may be in the range of 20 to 500 nm, 20 to 450 nm, 20 to 400 nm, 20 to 350 nm, 20 to 300 nm, 20 to 250 nm, 20 to 200 nm, 20 to 150 nm, 20 to 100 nm, or 20 to 50 nm.

The polymer of the polymeric particle is not so limited, but in preferred embodiments may be an acrylic polymer or co-polymer, an olefinic polymer or co-polymer, PVDF, and the like. Any polymeric particle known to be used as a binder in a ceramic coating of a battery separator could be used, so long as the binder particle is capable of having or has reactive functional groups on a surface thereof as described herein.

In some preferred embodiments, the particulate polymeric binder cross-linker or cross-linking agent comprises an acrylic binder particles with at least one of epoxy, amino, or isocyanate reactive functional groups on a surface thereof.

(b) POSS Cross-Linker or Cross-Linking Agent

The POSS cross-linker or cross-linking agent described herein is not so limited and may comprise a polyoctahedral silsesquioxane (POSS) with two or more, three or more, four or more, five or more, six or more, seven or more, eight or more, nine or more, ten or more, eleven or more, twelve or more, thirteen or more, fourteen or more, fifteen or more, sixteen or more, seventeen or more, eighteen or more, nineteen or more, or twenty or more reactive functional groups. One or more POSS cross-linkers or cross-linking agents may be used.

The POSS cross-linker or cross-linking agent may have a structure according to the following formula (3):

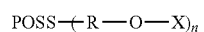
(3)

In formula (3), the POSS may have a random structure, a caged structure, an open-cage structure, a ladder-like structure, or a double-decker structure. Examples of these structures are shown in FIG. 6. In Formula (3) n may be an integer greater than 2, greater than 3, greater than 4, greater than 5, greater than 6, greater than 7, greater than 8, greater than 9, greater than 10, greater than 11, greater than 12, greater than 13, greater than 14, greater than 15, greater than 15, greater than 16, greater than 17, greater than 18, greater than 19, greater than 20. In formula 3 R may be a C1, C2, C3, C4, C5, C6, C7, C8, C9, or C10 saturated or unsaturated and branched or unbranched alkyl, alkene, or alkyne group. X is a reactive functional groups as described herein. In Formula (3) (ROX) is bonded to an oxygen or silicon of the POSS. The bond is preferably a covalent bond.

In some preferred embodiments, the POSS cross-linker or cross-linking agent may have the following specific structures (4) or (5):

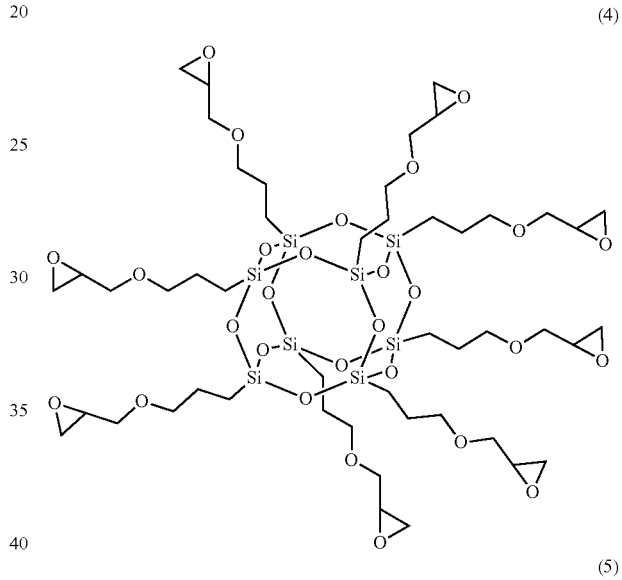

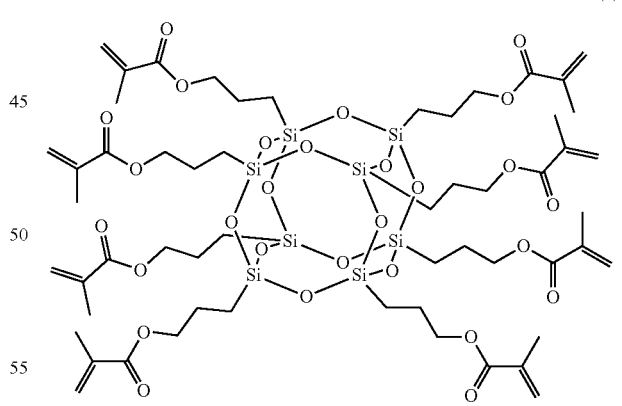

(c) PEO(PEG) Cross-Linker or Cross-linking Agents

For purposes of this application, it is understood that PEO and PEG have similar structures, but PEG is used commonly to refer to materials with a molecular weight less than about 100,000 while PEO is often used to refer to higher molecular weight materials with a molecular weight of about 100,000 or more.

The PEO(PEG) cross-linker is not so limited, but preferably comprises a PEO or PEG with two or more three or more, four or more, five or more, six or more, seven or more, eight or more, nine or more, ten or more, eleven or more, twelve or more, thirteen or more, fourteen or more, fifteen or more, sixteen or more, seventeen or more, eighteen or more, nineteen or more, or twenty or more reactive functional groups. One or more PEO(PEG) cross-linkers or cross-linking agents may be used.

The reactive functional groups may be at least one of those described herein and the reactive functional groups may be the same or different.

In some embodiments, the PEO(PEG) cross-linker or cross-linking agent is a bi-, tri-, tetra-, or poly-glycidyl ether. Poly may mean an integer between 5 and 20, 5 and 15, or 5 and 10 for the glycidyl ether functional groups. In some further embodiments, the PEO(PEG) cross-linker or cross-linking agent may be a bi-, tri-, tetra- or poly-acrylate. Poly may mean an integer between 5 and 20, 5 and 15, or 5 and 10 for the acrylate functional groups.

In some embodiments, the PEO(PEG) cross-linker or cross-linking agent may have any one of the following structures:

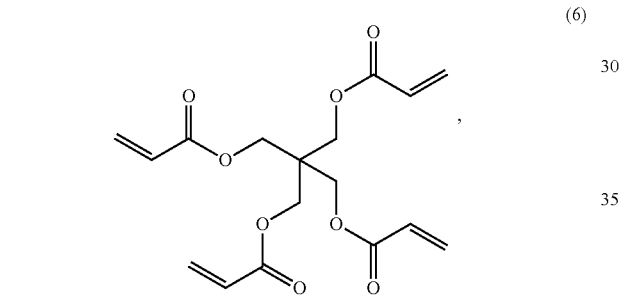

(6)

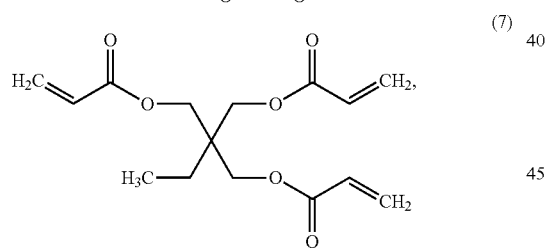

(7)

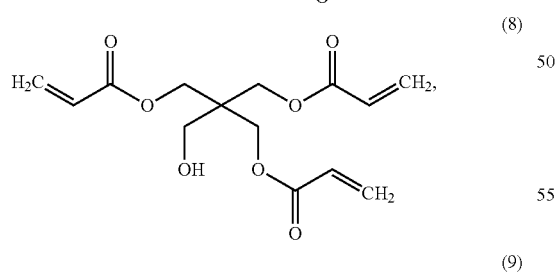

(8)

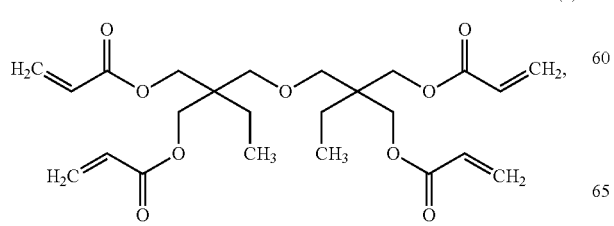

(9)

-continued

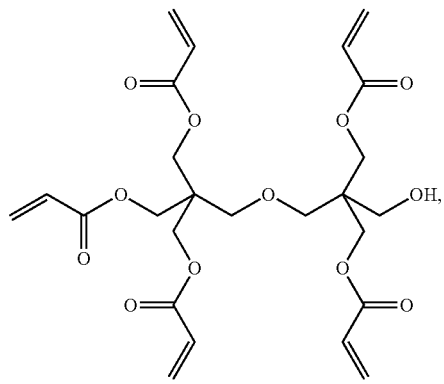

(10)

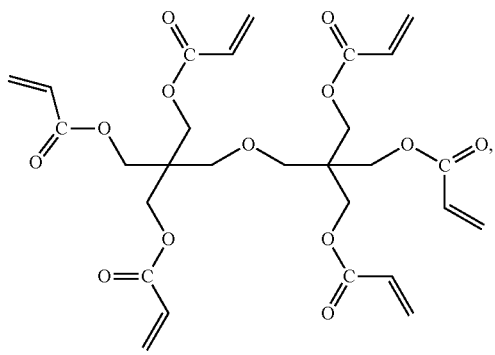

(11)

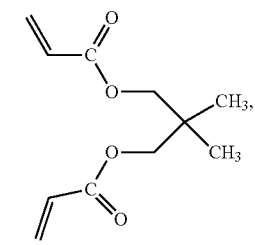

(12)

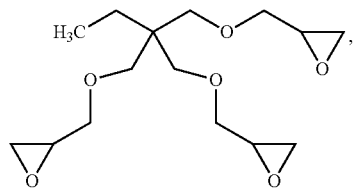

(13)

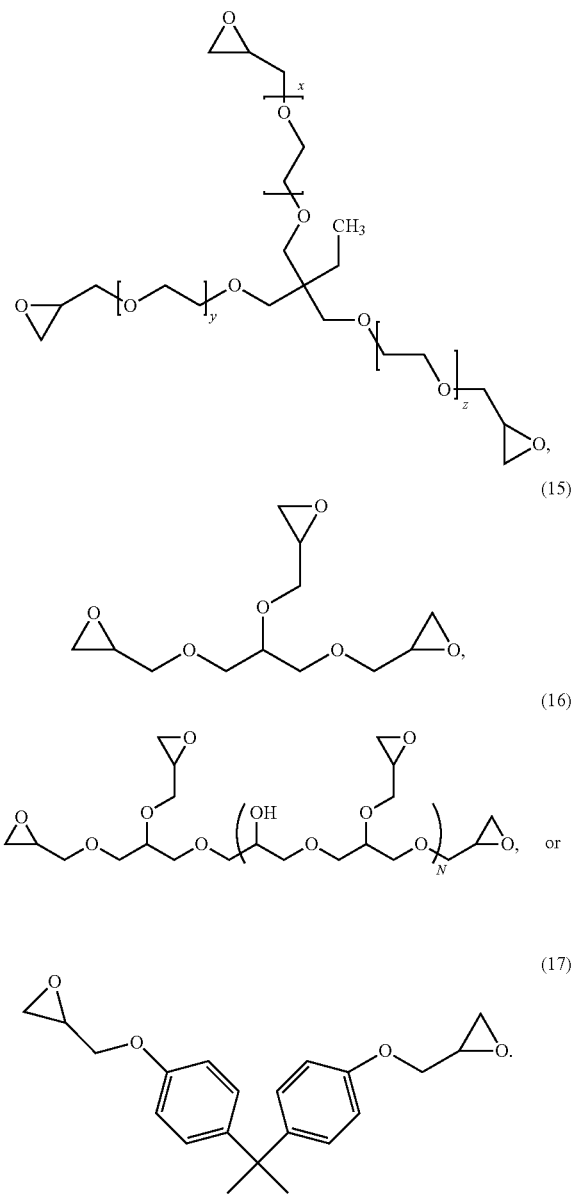

In some embodiments, the PEO(PEG) cross-linker or cross-linking agent may have the following structure (17)

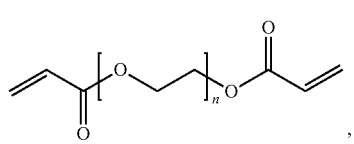

where n is an integer from 1 to 100,000, 1 and 90,000, 1 and 80,000, 1 and 70,000, 1 and 60,000, 1 and 50,000, 1 and 40,000, 1 and 30,000, 1 and 20,000, 1 and 10,000, 1 and 9,000, 1 and 8,000, 1 and 7,000, 1 and 6,000, 1 and 5,000, 1 and 4,000, 1 and 3,000, 1 and 2,000, and 1 and 1,000 or more The PEO(PEG) cross-linker or cross-linking agent may also have the following structure (18)

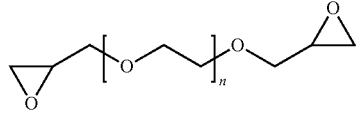

where n is an integer from 1 to 100,000, 1 and 90,000, 1 and 80,000, 1 and 70,000, 1 and 60,000, 1 and 50,000, 1 and 40,000, 1 and 30,000, 1 and 20,000, 1 and 10,000, 1 and 9,000, 1 and 8,000, 1 and 7,000, 1 and 6,000, 1 and 5,000, 1 and 4,000, 1 and 3,000, 1 and 2,000, and 1 and 1,000 or more.

In some embodiments where a PEO(PEG) cross-linker or cross-linking agent is used, a long-chain PEO, short-chain PEO, or mixtures thereof may be added in addition to the PEO(PEG) cross-linker. The long chain and short chain PEO(PEG) may have the following structure (19):

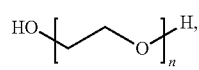

wherein n is less than 1,000, 900 or less, 800 or less, 700 or less, 600 or less, 500 or less, 400 or less, 300 or less, 200 or less, or 100 or less for a short-chain and 1,000 or more, 5,000 or more, 10,000 or more, 15,000 or more 25,000 or more, 35,000 or more, 45,000 or more, 55,000 or more, 65,000 or more, 75,000 or more, 85,000 or more, 95,000 or more, or as high as 100,000 for a long chain. When a mixture is used, the ratio of long chain to short chain PEO(PEG) may be from 1:100 to 100:1, including 50:50, 25:75, and 75:25.

Without wishing to be bound by any particular theory, it is believed that the addition of long and/or short-chain PEO(PEG) may improve the pin removal of the resulting coated membrane product. Pin removal is an important property for battery makers, particularly those making cylindrical cell-type batteries.

(3) Thickening Agent

The thickening agent is not so limited, and any thickening agent appropriate for use in a ceramic coating may be used. In some preferred embodiments, the thickening agent may have a structure that includes functional groups capable of reacting with the reactive functional groups of the cross-linker or cross-linking agent described herein. For example, the thickening agent may include carboxyl groups or hydroxyl groups. In some embodiments, a thickener that includes carboxyl or hydroxyl groups may be a cellulose-based thickener like carboxymethyl cellulose (CMC).

(4) Adhesion-Promotion Agent

The adhesion promotion agent is not so limited and includes any compound that improves the wet adhesion or dry adhesion of the resulting coated membrane. Dry adhesion may refer to the adhesion of the coating to a battery electrode material before electrolyte is added. Wet adhesion may refer to adhesion of the coating to an electrode after electrolyte is added in the battery cell. Any known material for this purpose may be used.

In some embodiments, the adhesion promotion agent may comprise a particulate material. The particulate material may be made of PVDF homopolymer or a co-polymer or terpolymer of PVDF. For example, PVDF-HFP, PVDF-CTFE, and the like are examples of PVDF co-polymers.

(5) Surfactant

The surfactant used herein is not so limited, and any surfactant used heretofore in a ceramic coating is acceptable.

In preferred embodiments, the surfactant used herein is a dianionic (two anionic groups), tri-anionic (three anionic groups), or poly-anionic (4 or more, 5 or more, 6 or more, 7 or more, 8 or more, 9 or more, and up to 10 anionic groups). The anionic groups may be the same or different. For example, in some embodiments, the anionic groups may be selected from carboxylate groups, sulfate groups, sulfonate groups, and phosphate groups.

In some preferred embodiments, the surfactant is a di-anionic surfactant. For example, the surfactant may have a di-carboxylate structure, a di-sulfate structure, a di-sulfonate structure, or a di-phosphate structure.

In some embodiments, di-anionic surfactant has a structure according to the following formula (1):

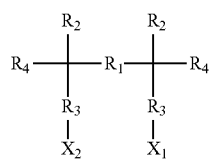

(1)

wherein X is an anionic group, $R_3$ is a C1 to C10, C1 to C9, C1 to C8, C1 to C7, C1 to C6, C1 to C5, C1 to C4, C1 to C3, C1 to C2, or C1 saturated or unsaturated branched or unbranched alkyl, alkene, or alkyne group; $R_4$ is a C1 to C10, C1 to C9, C1 to C8, C1 to C7, C1 to C6, C1 to C5, C1 to C4, C1 to C3, C1 to C2, or C1 saturated or unsaturated branched or unbranched alkyl, alkene, or alkyne group; $R_2$ is a C1 to C10, C1 to C9, C1 to C8, C1 to C7, C1 to C6, C1 to C5, C1 to C4, C1 to C3, C1 to C2, or C1 saturated or unsaturated branched or unbranched alkyl, alkene, or alkyne group; and $R_1$ is an alkyne or alkene group.

In some embodiments, the di-anionic surfactant has a structure according to the following formula (2)

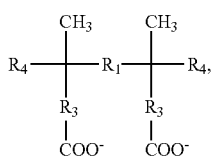

(2)

where $R_1$, $R_3$, and $R_4$ are as described above. In some preferred embodiments, $R_1$ may be an alkyne group or an alkene group.

It is understood that the anionic surfactant described herein may be added to the coating slurry with an appropriate cation, such as for example H+, M+, etc.

Without wishing to be bound by any particular theory, it is believed that one desired property of the anionic surfactant herein is the presence of two or more anionic groups with two or more of the anionic groups preferably confined on one side of the structure. In structures (1) and (2) above, this confinement is achieved by choosing $R_1$ such that rotation about $R_1$ is prohibited and the location of the anionic groups in the molecule is fixed. See, for example FIG. 7, which explains this in more detail, though the mechanism for fixation of the anionic groups is not limited to the use of an alkyne group. Use of these types of surfactants may improve the wettability of the resulting coating, may lower dynamic surface tension properties of the resulting coating and/or may inhibit foaming of the coating slurry used to form the coating, which is a desirable property. Without wishing to be bound to any particular theory, this may result from the large hydrophilic parts of the surfactant made possible by the fixation of the anionic groups on one side of the surfactant molecule.

(6) Dispersant

The dispersant is not so limited and any dispersant used heretofore in a ceramic coating is acceptable. In some preferred embodiments, the dispersant may comprise at least one of carboxyl or hydroxyl functional groups.

(7) Binder

The binder is not so limited and any binder used heretofore in a ceramic coating is acceptable. In some example, part of the binder may be particulate polymeric binder cross-Linker or cross-linking agent, and some may not.

Method for Making a Coated Membrane

The method for making a coated membrane as described herein is not so limited, but may comprise, consist of, or consist essentially of the following steps: (1) forming a coating slurry, (2) applying the coating slurry to at least one side of a porous membrane, (3) cross-linking the applied coating slurry, and (4) drying the applied coating slurry before and/or after cross-linking.

(1) Forming a Coating Slurry

This step is not so limited, but in preferred embodiments may comprise, consist of, or consist essentially of adding at least ceramic and a cross-linker or cross-linking agent to a solvent. The solvent may be water, water plus ten volume percent or less of an alcohol or an organic solvent, or the solvent may be mainly (i.e., more than 50%) organic solvent. In a preferred embodiments, the solvent is water or water plus ten volume percent or less of an alcohol or an organic solvent.

A thickening agent, an adhesion-promotion agent, a surfactant, a dispersant, a binder and combinations thereof may also be added to the coating slurry.

The coating slurry may be a high solid content coating slurry or a low solid content coating slurry. High solid content may be more than 50% solid content with the remainder being solvent. Low solid content may be 50% or less solid content with the remainder being solvent.

(2) Applying the Coating Slurry to at least One Side of The Porous Membrane

This step is not so limited, and any known application method may be used to apply the coating slurry to a surface of the microporous membrane.

In some embodiments, a corona treatment may be performed to a side of the porous membrane prior to application of the coating slurry to that side, and sometimes it may not be applied. Typically, a surfactant may be unnecessary if a corona treatment is performed, but corona treatment may cause issues, particularly if a thinner porous membrane is used.

(3) Cross-Linking the Applied Coating Slurry

In this step, light, heat, or a combination of light and heat may be used to cross-link the applied coating slurry. In some embodiments, light may be ultraviolet (UV) light.

In some embodiments, the applied coating slurry must include photoinitiators or photosensitizers in instances where cross-linking cannot be initiated by the application of light or heat in their absence. For example, when the cross-linkers or cross-linking agents described herein include vinyl reactive functional groups, use of a photoinitiators or photosensitizers may be necessary. In this case, light that the photoinitiators or photosensitizers absorb may be applied to the applied coating slurry containing the same, a radical species may be generated, and cross-linking can proceed.

(4) Drying the Applied Coating Slurry

This step is not so limited and may be performed before cross-linking, after cross-linking, during cross-linking, before and after cross-linking, before and during cross-linking, during and after cross-linking, or before, during, and after cross-linking. In some embodiments, drying is achieved by blowing air over the applied coating slurry, applying heat to the applied coating slurry, or blowing air and applying heat to the applied coating slurry.

EXAMPLES

Examples with Particulate Acrylic Cross-linker or Cross-linking Agent In an example, a particulate polymeric cross-linker or cross-linking agent may be formed by at least a step of reacting an acrylic polymer having reactive vinyl groups with a reactive monomer such as the following:

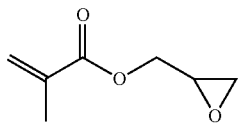

This way a particulate acrylic cross-linker or cross-linking agent with an epoxy group on a surface thereof may be formed. An aqueous slurry was then formed using alumina as the ceramic and a di-carboxylate surfactant. The amounts of each component relative to 100 parts of alumina is shown in the Table in FIG. 1.

A comparative slurry was made with at least no cross-linker or cross-linking agent and no di-carboxylate surfactant.

The inventive and comparative slurries were coated onto a Celgard® base film 1 (base film 1). The inventive slurry was cross-linked using heat. Inventive Example 1 and Comparative Example 1, respectively, were thus formed.

Properties of the coated films and the uncoated base film were obtained and are reported in the tables in FIG. 2 and FIG. 3. As can be seen by the information in these tables, high temperature shrinkage, e.g., shrinkage at 150° C., of the Inventive Example is nearly 5 times lower than that of the Comparative Example. The results in these tables are significant and show the increased thermal stability of the inventive separators described herein. This is significant. Shrinkage of the separator in the battery may lead to short-circuit.

The inventive and comparative slurries were also coated on a second Celgard® base film (Base Film 2), forming Inventive Examples 2 and 3 and Comparative Examples 2 and 3, respectively. The base film 2 had a thickness of about 12 microns. Examples with a coating thickness of about 2.5 microns and 4 microns (Inventive Examples 2 and 3; and Comparative Examples 2 and 3) were formed. The inventive coatings were cross-linked, forming Inventive Examples 2 and 3. Properties were measured and are reported in the table in FIG. 4. As seen in table in FIG. 4, high temperature thermal shrinkage of the Comparative Example 2, which has the thinner coating, is nearly three times that of Inventive Example 2, which has a coating with a similar thickness. In order to obtain decent high-temperature shrinkage, e.g., like in Comparative Example 3, a coating greater than 2.5 microns must be formed. The results in this table are significant because they show that good high temperature shrinkage can be obtained with thinner coatings. The ability to use thinner coatings results in an ability to form a thinner separator. The industry desires thinner separators because they allow for the formation of batteries with higher energy density.

Examples with Di-anionic Acetylene Surfactant

Inventive Examples 4 and 5 were formed with a di-anionic acetylene surfactant 1 and a di-anionic acetylene surfactant 2. For example, this may be a structure as shown in formula (1) or (2) described herein, where $R_1$ is an alkyne group. Comparative Examples 4, 5, and 6 were formed where a non-ionic PEO type surfactant, a non-ionic acetylene surfactant 1, and a non-ionic acetylene surfactant 2. Data in FIG. 8 shows that the contact angle for coating slurries containing the di-carboxylate surfactant are lower than those not using it. A coating with a lower contact angle is more wettable, which is a preferable property for a battery separator. As shown in FIG. 9, a lower contact angle also results in a smooth coating surface or higher coating uniformity. Because of the lower contact angle achieved even with lower surfactant amount, good properties of the coated membrane may be maintained. Lower surfactant level is important to obtain good properties especially when the membrane is used as a battery separator. FIG. 10 shows the effects of adding higher levels of surfactant. With the di-carboxylate surfactant, better wettability is achieved with lower levels of surfactant than other surfactants.

Examples with PEO-based Cross-linker or Cross-linking Agent

The slurries for Inventive Example 6 and Inventive Example 7 were formed like Inventive Example 1 except a PEO-based particulate cross-linker or cross-linking agent as described in FIG. 11 (see A and B) is used. Also, carboxymethylcellulose (CMC) was used as the thickener. A cross-linking reaction of the PEO-based particulate cross-linker or cross-linking agent and the CMC is shown in FIG. 11. The slurry for Inventive Example 8 is like that for Inventive Example 1, using the same acrylic-based cross-linker or cross-linking agent. The slurry for Comparative Example 7 is like that for Comparative Example 1.

Each of the Comparative and Inventive Example slurries were coated on base film 1. Data for these Example 6 and Comparative Example 7 is found in FIGS. 12 to 15. These Inventive Examples with PEO-based cross-linker or cross-linking agent also show excellent high temperature stability. This is shown, for example, by looking at the high temperature shrinkage data. FIG. 12 visually shows the difference in shrinkage between comparative and inventive samples, which started out at the same size before heating. However, unlike the Inventive Examples using the acrylic-based cross-linker, these Inventive Examples also exhibit low pin removal force. Low pin removal force is an important separator property to battery makers. Low pin removal is particularly important for cylindrical cell assembly, allowing for smooth removal of the pin.

As shown in FIG. 16, the Inventive examples here, i.e., Inventive Example 7 with PEO-cross-linker, also has improved properties compared to other Inventive Examples disclosed hereinabove i.e., Inventive Example 8 with an acrylic-cross-linker. For example, Inventive Example 7 has lower moisture content. Low moisture is important for battery cycle life. Moisture ($H_2O$) in the battery separator could form gas and/or HF in the battery. Furthermore, the slurry used for these Inventive Examples was found to be less reactive than that used, for example, for Inventive Example 1. This is a benefit for production. The slurry does not prematurely react and clog the machinery.

The invention claimed is:

1. A coated battery separator comprising:
   a microporous membrane; and
   a cross-linked ceramic coating on at least one side of the microporous membrane, wherein the cross-linked coating comprises a surfactant, wherein the surfactant is a di-anionic surfactant, and the di-anionic surfactant has a di-carboxylate structure; and wherein the cross-linked coating has a thickness of about 5 microns or less and the coated battery separator exhibits an MD heat shrinkage at 150° C. less than 10%.

2. The coated battery separator of claim 1, wherein the MD heat shrinkage at 150° C. is less than 5%.

3. A coated battery separator comprising:
   a microporous membrane; and
   a cross-linked ceramic coating on at least one side of the microporous membrane, wherein the cross-linked ceramic coating comprises a surfactant, wherein the surfactant is a di-anionic surfactant, and the di-anionic surfactant has a di-carboxylate structure; and
   wherein the coated separator exhibits a load increase of less than 250% after 2 days in the electrolytes.

4. A coated battery separator comprising:
   a microporous membrane; and
   a cross-linked ceramic coating on at least one side of the microporous membrane, wherein the ceramic coating comprises ceramic particles, a particulate polymeric binder cross-linker or cross-linking agent, and a surfactant; wherein
   the ceramic particles may comprise at least one selected from the following group: silicon dioxide ($SiO_2$), titanium oxide ($TiO_2$), boehmite, aluminum oxide ($Al_2O_3$), magnesium oxide (MgO), barium sulfate ($BaSO_4$), and calcium carbonate ($CaCO_3$);
   the surfactant is a di-anionic surfactant, and the di-anionic surfactant has a di-carboxylate structure;
   and wherein the cross-linked ceramic coating has a thickness from 0.1 to 10 microns.

5. The coated battery separator of claim 4, wherein the particulate polymeric binder cross-linker or cross-linking agent comprise a particulate acrylic binder cross-linker or cross-linking agent.

6. The coated battery separator of claim 5, wherein the particulate acrylic binder cross-linker or cross-linking agent further comprises at least one of the following functional groups on a surface thereof: an epoxy group, an amino group, and an isocyanate group.

7. The coated battery separator of claim 4, wherein the particulate polymeric binder cross-linker or cross-linking agent comprise at least one of the following functional groups on a surface thereof: an epoxy group, a vinyl group, an amino group, and an isocyanate group.

8. The coated battery separator of claim 4, wherein the coating comprises the particulate polymeric binder cross-linker or cross-linking agent in an amount of 0.01 to 100 parts by weight per 100 parts by weight of the ceramic particles.

9. The coated battery separator of claim 4, wherein the coating further comprises at least one selected from a thickening agent, an adhesion-promotion agent, and a dispersant.

10. The coated battery separator of claim 9, comprising an adhesion promotion agent, wherein the adhesion promotion agent is a PVDF homopolymer or copolymer or particles comprising a PVDF homopolymer or copolymer.

11. The coated battery separator of claim 9, wherein the surfactant with a di-carboxylate structure has the following structure:

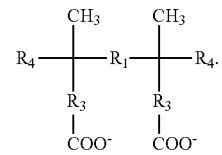

wherein $R_3$ is a C1 to C10 saturated or unsaturated branched or unbranched alkyl, alkene, or alkyne group; $R_4$ is a C1 to C10 saturated or unsaturated branched or unbranched alkyl, alkene, or alkyne group; and $R_1$ is an alkyne or alkene group.

12. The coated battery separator of claim 4, wherein the cross-linked ceramic coating is formed by applying a coating slurry to the micorporous membrane and cross-linking the applied coating slurry using heat, light, or both, and with or without the addition of a photosensitizer or photoinitiator, wherein optionally the coating slurry is an aqueous coating slurry or a coating slurry where the solvent is water and less than 10 volume % of an organic solvent and/or an alcohol.

13. A coated battery separator comprising:
   a microporous membrane; and a cross-linked ceramic coating on at least one side of the microporous membrane, wherein the cross-linked ceramic coating comprises ceramic particles, a surfactant, and a polymer/polyhedral oligomer silsesquioxane (POSS) cross-linker or cross-linking agent having two or more reactive groups, wherein:
   the ceramic particles may comprise at least one selected from the following group: silicon dioxide ($SiO_2$), titanium oxide ($TiO_2$), boehmite, aluminum oxide ($Al_2O_3$), magnesium oxide (MgO), barium sulfate ($BaSO_4$), and calcium carbonate ($CaCO_3$);
   the surfactant is a di-anionic surfactant, and the di-anionic surfactant has a di-carboxylate structure; and
   wherein the cross-linked ceramic coating may have a thickness from 0.1 to 10 microns.

14. The coated battery separator of claim 13, wherein the reactive groups comprise at least one selected from an epoxy group, an amino group, a vinyl group, a (meth)acryloxy group, an isocyanate group, and a mercapto group.

15. The coated battery separator of claim 13, wherein the POSS of the POSS cross-linker or cross-linking agent has a random structure, a caged structure, an open-cage structure, a ladder-like structure, or a double-decker structure.

16. The coated battery separator of claim 13, wherein the POSS cross-linker or cross-linking agent has the following general structure:

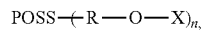

POSS─(R─O─X)$_n$, wherein the POSS may have a random structure, a caged structure, an open-cage structure, a ladder-like structure, or a double-decker structure, n is an integer greater than 2, R is a C1 to C10 saturated or unsaturated alkyl, alkene, or alkyne group; X is a reactive group, and wherein (R─O─X) is bonded to an oxygen or silicon of the POSS.

17. The coated battery separator of claim 13, wherein the coating comprises the POSS cross-linker or cross-linking agent in an amount of 0.01 to 100 parts by weight per 100 parts by weight of the ceramic particles.

18. The coated battery separator of claim 13, wherein the coating further comprises at least one of the following a binder, a thickening agent, an adhesion promotion agent, and a dispersant.

19. The coated battery separator of claim 13, wherein the cross-linked ceramic coating is formed by applying a coating slurry to the microporous membrane and cross-linking the applied coating slurry using heat, light, or both, and with or without the addition of a photosensitizer or photoinitiator, wherein the coating slurry is optionally an aqueous coating slurry or a coating slurry where the solvent is water and less than 10 volume % of an organic solvent and/or an alcohol.

20. A coated battery separator comprising:
a microporous membrane; and
a cross-linked ceramic coating on at least one side of the microporous membrane, wherein the cross-linked coating comprises ceramic particles, a surfactant, and a polyethylene oxide (PEO)/Polyethylene glycol (PEG) cross-linker or cross-linking agent having two or more reactive groups, wherein:
the ceramic particles may comprise at least one selected from the following group: silicon dioxide (SiO$_2$), titanium oxide (TiO$_2$), boehmite, aluminum oxide (Al$_2$O$_3$), magnesium oxide (MgO), barium sulfate (BaSO$_4$), and calcium carbonate (CaCO$_3$);
the surfactant is a di-anionic surfactant, and the di-anionic surfactant has a di-carboxylate structure; and
wherein the cross-linked coating may have a thickness from 0.1 to 10 microns.

21. The coated battery separator of claim 20, wherein the reactive groups comprise at least one of epoxy group, a vinyl group, an amino group, and an isocyanate group.

22. The coated battery separator of claim 20, wherein:
the PEO(PEG) cross-linker or cross-linking agent is a bi-, tri-, tetra-, or poly-glycidyl ether: or
the PEO(PEG) cross-linker or cross-linking agent is a bi-, tri-, tetra- or poly-acrylate.

23. The coated battery separator of claim 20, wherein the coating comprises the PEO(PEG) cross-linker or cross-linking agent in an amount of 0.01 to 100 parts by weight per 100 parts by weight of the ceramic particles.

24. The coated battery separator of claim 20, wherein the coating further comprises at least one of the following a binder, a thickening agent, an adhesion promotion agent, and a dispersant.

25. The coated battery separator of claim 20, wherein the cross-linked ceramic coating is formed by applying a coating slurry to the microporous membrane and cross-linking the applied coating slurry using heat, light, or both, and with or without the addition of a photosensitizer or photoinitiator, and optionally, the coating slurry is an aqueous coating slurry or a coating slurry where the solvent is water and less than 10 volume % of an organic solvent and/or an alcohol.

26. The coated battery separator of claim 20, wherein the PEO(PEG) cross-linker is mixed with a long-chain PEO (PEG), a short-chain PEO(PEG), or a mixture of a long chain and a short chain PEO(PEG) having the following formula:

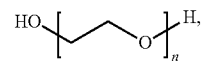

wherein n is less than 1,000 for a short chain PEO(PEG) and n is greater than 1,000 for a long chain PEO(PEG).

27. A coated battery separator comprising:
a porous membrane; and
a cross-linked ceramic coating, comprising ceramic particles, a cross-linker or cross-linking agent, and a di-anionic surfactant having a di-carboxylate structure, wherein the di-anionic surfactant having a di-carboxylate structure has the following structure:

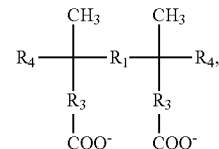

wherein R$_3$ is a C1 to C10 saturated or unsaturated branched or unbranched alkyl, alkene, or alkyne group: R$_4$ is a C1 to C10 saturated or unsaturated branched or unbranched alkyl, alkene, or alkyne group; and R$_1$ is an alkyne or alkene group.

* * * * *